United States Patent
D'Amico et al.

(10) Patent No.: US 9,846,107 B1
(45) Date of Patent: Dec. 19, 2017

(54) SYSTEMS, APPARATUSES AND METHODS FOR ANALYZING COMBUSTION GASES AND PRESENTING COMBUSTION PROCESS DIAGNOSTICS

(71) Applicant: Bacharach, Inc., New Kensington, PA (US)

(72) Inventors: David J. D'Amico, Sarver, PA (US); Doug W. Keeports, Murrysville, PA (US); Ralph J. Jenkins, New Kensington, PA (US)

(73) Assignee: Bacharach, Inc., New Kensington, PA (US)

( * ) Notice: Subject to any disclaimer, the term of this patent is extended or adjusted under 35 U.S.C. 154(b) by 791 days.

(21) Appl. No.: 14/160,519

(22) Filed: Jan. 21, 2014

Related U.S. Application Data

(60) Provisional application No. 61/754,105, filed on Jan. 18, 2013.

(51) Int. Cl.
| | |
|---|---|
| *G06F 11/00* | (2006.01) |
| *G06F 11/30* | (2006.01) |
| *G01M 99/00* | (2011.01) |

(52) U.S. Cl.
CPC .................................. *G01M 99/00* (2013.01)

(58) Field of Classification Search
CPC ...... G01M 13/00; G01M 15/00; G01M 17/00; G01M 99/00
USPC .... 702/24, 104, 183, 186, 185, 184; 60/286, 60/278, 277; 701/102, 31, 29.3
See application file for complete search history.

(56) References Cited

U.S. PATENT DOCUMENTS

| | | | | | |
|---|---|---|---|---|---|
| 6,085,132 | A | * | 7/2000 | Ishii | ......................... F02D 41/22 123/479 |
| 2001/0034576 | A1 | * | 10/2001 | Vojtisek-Lom | ....... G01M 15/10 701/102 |
| 2012/0323499 | A1 | * | 12/2012 | Yelin | ...................... G06Q 10/10 702/24 |

* cited by examiner

*Primary Examiner* — Eman Alkafawi
(74) *Attorney, Agent, or Firm* — Fay Sharpe LLP

(57) ABSTRACT

An analyzer and diagnostic system can include one or more sensors that are operable to generate combustion condition data relating to the performance of an associated combustion system. An analysis module can be operable to analyze at least a portion of the combustion condition data and determine a state of the associated combustion system. A diagnostic module can be operable to identify one or more recommended corrective actions for a combustion system performance deviation from a plurality of recommended corrective actions using one or more logic algorithms. Handheld instruments and methods of analyzing and diagnosing combustion processes are also included.

20 Claims, 17 Drawing Sheets

| Parameter 1(O,L,H) | O | O | O | O | O | O | L | L | L | L | L | L | H | H | H | H | H | H |
|---|---|---|---|---|---|---|---|---|---|---|---|---|---|---|---|---|---|---|
| Parameter 2(O,L,H) | O | O | L | L | H | H | O | O | L | L | H | H | O | O | L | L | H | H |
| Parameter 3(O,H) | O | H | O | H | O | H | O | H | O | H | O | H | O | H | O | H | O | H |

| Category | Action | State | | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| Category A | | | | | | | | 1 | 1 | 2 | 1 | 3 | 2 | | | | | | |
| | Action A1 | | | | | | | | x | | x | x | x | | | | | | |
| | Action A2 | | | | | | | x | x | x | | x | | | | | | | |
| | Action A3 | | | | | | | x | | | | x | x | | | | | | |
| Category B | | | | | | | | | | | | | | 1 | 1 | 2 | 1 | 1 | 2 |
| | Action B1 | | | | | | | | | | | | | | x | x | x | x | x |
| | Action B2 | | | | | | | | | | | | | x | | x | x | | x |
| | Action B3 | | | | | | | | | | | | | x | x | | x | | x |
| | Action B4 | | | | | | | | | | | | | x | x | | | x | x |
| Category C | | | 1 | 2 | | | | | 1 | 4 | | | | 2 | 3 | 1 | 3 | | |
| | Action C1 | | | x | | | | | x | x | | | | x | | x | x | | |
| | Action C2 | | x | | | | | | | x | | | | | x | x | | | |
| | Action C3 | | | x | | | | | | x | | | | x | x | x | x | | |
| | Action C4 | | | x | | | | | | x | | | | x | | x | x | | |
| Category D | | | 2 | | 3 | 1 | 2 | 3 | | | 4 | 1 | | | | | | 2 | 1 |
| | Action D1 | | x | | x | | x | x | | | | x | | | | | | x | x |
| | Action D2 | | x | | x | | | | | | | x | | | | | | x | |
| | Action D3 | | x | | | x | x | x | | | x | | | | | | | | |
| Category E | | | 3 | | 3 | | 3 | | 4 | | 3 | | 4 | 3 | 4 | | 4 | | 4 |
| | Action E1 | | | | x | | | | | | x | | | | | | | | x |
| | Action E2 | | x | | x | | x | | | | | | x | x | x | | x | | |
| | Action E3 | | | | x | | x | | | | x | | | x | x | | | | x |
| | Action E4 | | x | | x | | x | | x | | x | | | x | | x | | x | |
| | Action E5 | | x | | | | x | | x | | | | | x | | | | | x |
| Category F | | | | | 1 | 4 | | | | | 1 | 5 | | | | | 3 | 5 |
| | Action F1 | | | | x | | | | | | x | | | | | | | x | x |
| | Action F2 | | | | | x | | | | | | x | | | | | | | |

FIG. 12A

|              |          | O | O | O | O | O | O | L | L | L | L | L | L | H | H | H | H | H | H |
|--------------|----------|---|---|---|---|---|---|---|---|---|---|---|---|---|---|---|---|---|---|
| Parameter 1(O,L,H) |    | O | O | O | O | O | O | L | L | L | L | L | L | H | H | H | H | H | H |
| Parameter 2(O,L,H) |    | O | O | L | L | H | H | O | O | L | L | H | H | O | O | L | L | H | H |
| Parameter 3(O,H)   |    | O | H | O | H | O | H | O | H | O | H | O | H | O | H | O | H | O | H |

|            |           | State |   |   |   |   |   |   |   |   |    |    |    |    |    |    |    |    |    |
|------------|-----------|---|---|---|---|---|---|---|---|---|----|----|----|----|----|----|----|----|----|
| Category   | Action    | 1 | 2 | 3 | 4 | 5 | 6 | 7 | 8 | 9 | 10 | 11 | 12 | 13 | 14 | 15 | 16 | 17 | 18 |
| Category G |           |   |   | 2 | 4 | 2 | 5 |   |   | 3 | 5  | 2  | 6  |    |    | 3  | 5  | 4  | 6  |
|            | Action G1 |   |   |   |   | x | x |   |   |   |    | x  |    |    |    |    |    | x  | x  |
|            | Action G2 |   |   | x | x |   | x |   |   | x | x  | x  | x  |    |    | x  | x  | x  | x  |
|            | Action G3 |   |   |   |   |   | x |   |   |   |    |    | x  |    |    |    |    | x  | x  |
|            | Action G4 |   |   |   |   | x | x |   |   |   |    | x  | x  |    |    |    |    | x  | x  |
|            | Action G5 |   |   |   |   | x |   |   |   |   |    | x  |    |    |    |    |    | x  | x  |
| Category H |           |   | 1 |   | 1 |   | 2 |   | 2 |   | 2  |    | 3  |    | 2  |    | 2  |    | 3  |
|            | Action H1 |   | x |   | x |   | x |   |   |   | x  |    | x  |    |    |    | x  |    | x  |
|            | Action H2 |   | x |   |   |   | x |   | x |   |    |    |    |    | x  |    |    |    | x  |
|            | Action H3 |   |   |   | x |   | x |   | x |   |    |    | x  |    | x  |    | x  |    | x  |
|            | Action H4 |   |   |   |   |   |   |   |   |   |    |    | x  |    |    |    |    |    | x  |
|            | Action H5 |   | x |   | x |   |   |   | x |   | x  |    |    |    | x  |    |    |    | x  |
|            | Action H6 |   | x |   |   |   |   |   |   |   | x  |    |    |    | x  |    | x  |    | x  |
| Category J |           |   |   | 3 | 5 | 4 | 6 |   |   | 4 | 6  | 5  | 7  |    |    | 4  | 6  | 5  | 7  |
|            | Action J1 |   |   | x |   | x | x |   |   | x |    | x  |    |    |    | x  |    | x  | x  |
|            | Action J2 |   |   |   | x |   |   |   |   | x |    |    |    |    |    |    | x  | x  |    |
|            | Action J3 |   |   |   | x | x | x |   |   |   | x  | x  |    |    |    |    |    | x  | x  |
|            | Action J4 |   |   |   |   | x |   |   |   |   |    | x  |    |    |    |    |    |    |    |

FIG. 12B

SYSTEMS, APPARATUSES AND METHODS FOR ANALYZING COMBUSTION GASES AND PRESENTING COMBUSTION PROCESS DIAGNOSTICS

This application claims the benefit of U.S. Provisional Patent Application No. 61/754,105, filed on Jan. 18, 2013, the content of which is hereby incorporated herein by reference in its entirety.

BACKGROUND

The subject matter of the present disclosure broadly relates to the art of combustion process analysis and diagnostics and, more particularly, to systems, apparatuses and methods for extracting and analyzing combustion gases associated with combustion appliances and/or systems as well as presenting combustion process diagnostics based, at least in part, on the results of such analyses.

It will be appreciated that the subject matter of the present disclosure finds particular application and use in conjunction with portable instruments, and will be illustrated and described herein with particular reference thereto. However, it is to be recognized and understood that the subject matter of the present disclosure is amenable to use in other applications and/or environments, such as use in connection with fixed instrumentation, for example, and that the configurations shown and described herein are merely exemplary and not intended to be limiting.

A variety of portable instruments have been developed for use in sampling and analyzing gases and gaseous by-products of combustion processes, such as may occur in connection with combustion appliances and/or systems of a different types and kinds. In many cases, such portable instruments are used to analyze gases and gaseous by-products discharged through a chimney, flue or other exhaust conduit of a combustion system that utilizes a burner to generate controlled combustion of a fuel, such as natural gas, liquefied petroleum gas or fuel oil, for example. Such combustion appliances and/or systems often take the form of heating apparatuses and are commonly used in industrial, commercial and residential buildings to provide warm air, hot water or steam that can be transported throughout the building, such as for heating and/or other purposes. Non-limiting examples of such heating apparatuses include the types commonly referred to as furnaces and boilers.

The known designs of portable instruments for sampling and analyzing combustion gases typically measure one or more ambient conditions at or around the combustion appliance and/or system being tested. In some cases, known portable instruments may provide for the entry or selection of basic information regarding the combustion appliance and/or system being tested, such as fuel type. If provided, such information may be entered into the device by the technician testing the combustion system. Finally, the portable instrument is used to sample, analyze and, in some cases, record one or more properties of the combustion gases being tested.

Once the combustion gases have been tested, known devices may be capable of generating output in one or more forms that communicate properties and/or characteristics of the tested combustion gases to the technician. In some cases, known devices may be capable of identifying properties of the combustion gases that are within and/or outside of an acceptable range for a given property. In other cases, the technician may manually determine the properties of the combustion gases that are within and/or outside of the corresponding acceptable ranges for those properties.

Using the results of the combustion gas test together with some combination of training, experience and, commonly, significant trial and error, a technician will then selectively adjust various components and/or operational parameters of the combustion system in an attempt to reach a condition in which most or all of the combustion gas properties are within a predetermined range or are otherwise identified as having an acceptable value. Typically, the process of testing, analyzing and adjusting is repeated numerous times by the technician until the desired performance and/or operating conditions of the combustion appliance and/or system are achieved. In some cases, experienced technicians may be capable of achieving the desired performance and/or operating conditions with a reasonable number of trial and error attempts. However, due to the number of parameters and combinations of adjustments that can be made, novice technicians may perform a significantly greater number of trial and error iterations before achieving the desired conditions of operation.

Notwithstanding the common usage and overall success of conventional instruments for analyzing combustion gases, certain areas of improvement in the art of analyzing and adjusting combustion processes still remain. Accordingly, it is believed desirable to develop systems, apparatuses and methods for analyzing combustion gases and presenting combustion process diagnostics that overcome the foregoing and/or other deficiencies associated with conventional instrumentation, and/or otherwise advance the art of analyzing and diagnosing combustion processes.

BRIEF DESCRIPTION

One example of an analyzer and diagnostic system in accordance with the subject matter of the present disclosure can include a testing and operation module that can be operative to receive combustion system data associated, such as may be associated with the operation of a combustion appliance or system. The system can also include one or more sensors that can be operative to generate combustion gas data relating to or otherwise associated with combustion gases and/or environmental conditions. The system can further include an analysis module that can be operative to analyze combustion gas data and/or combustion system data to determine one or more operating conditions of the combustion appliance or system. The system can also include a diagnostic module that can be operative to diagnose one or more operating conditions of the combustion appliance or system based at least in part on the analysis of combustion gas data and/or combustion system data by utilizing one or more logic algorithms to determine deviant operating conditions and recommended corrective actions.

Another example of an analyzer and diagnostic system in accordance with the subject matter of the present disclosure can include one or more sensors that can be operative to generate combustion gas data relating to or otherwise associated with combustion gases and/or environmental conditions of an associated combustion appliances and/or systems. The system can also include one or more processors that can be programmed to receive combustion system data associated with a combustion appliance or system. The one or more processors can also be programmed to analyze combustion gas data and/or combustion system data to determine one or more operating conditions of the combustion appliance or system. The one or more processors can be further programmed to diagnose one or more operating conditions of the combustion appliance or system based at least in part on the analysis of combustion gas data and/or combustion system data by utilizing one or more logic algorithms to determine deviant operating conditions and recommended corrective actions.

An analyzer and diagnostic instrument in accordance with the subject matter of the present disclosure can include a housing having a housing wall that at least partially defines a housing cavity. The instrument can also include an analyzer and diagnostic system, such as has been described in either or both of the foregoing paragraphs.

One example of a method of analyzing combustion gases and presenting combustion process diagnostics in accordance with the subject matter of the present disclosure can include receiving combustion system data, such as may be associated with the operation of a combustion appliance or system. The method can also include generating combustion gas data relating to or otherwise associated with combustion gases, such as may be associated with the operation and/or ambient environment of the combustion appliance or system. The method can further include analyzing combustion gas data and/or combustion system data to determine one or more operating conditions of the combustion appliance or system. The method can also include diagnosing one or more operating conditions of the combustion appliance or system based at least in part on the analysis of combustion gas data and/or combustion system data by utilizing one or more logic algorithms to determine deviant operating conditions and recommended corrective actions.

BRIEF DESCRIPTION OF THE DRAWINGS

FIGS. 12A and 12B represent one example of a table containing combustion parameters, parameter states as well as prioritized diagnostic categories and corrective actions for use in connection with a logic algorithm in accordance with the subject matter of the present disclosure.

DETAILED DESCRIPTION

As used herein, terms such as "data", "values", "information", "signals" and the like are used interchangeably herein to broadly refer to analog and/or digital communications, such as may be transferred, stored, retrieved and/or otherwise exchanged between components and/or systems in any suitable manner.

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
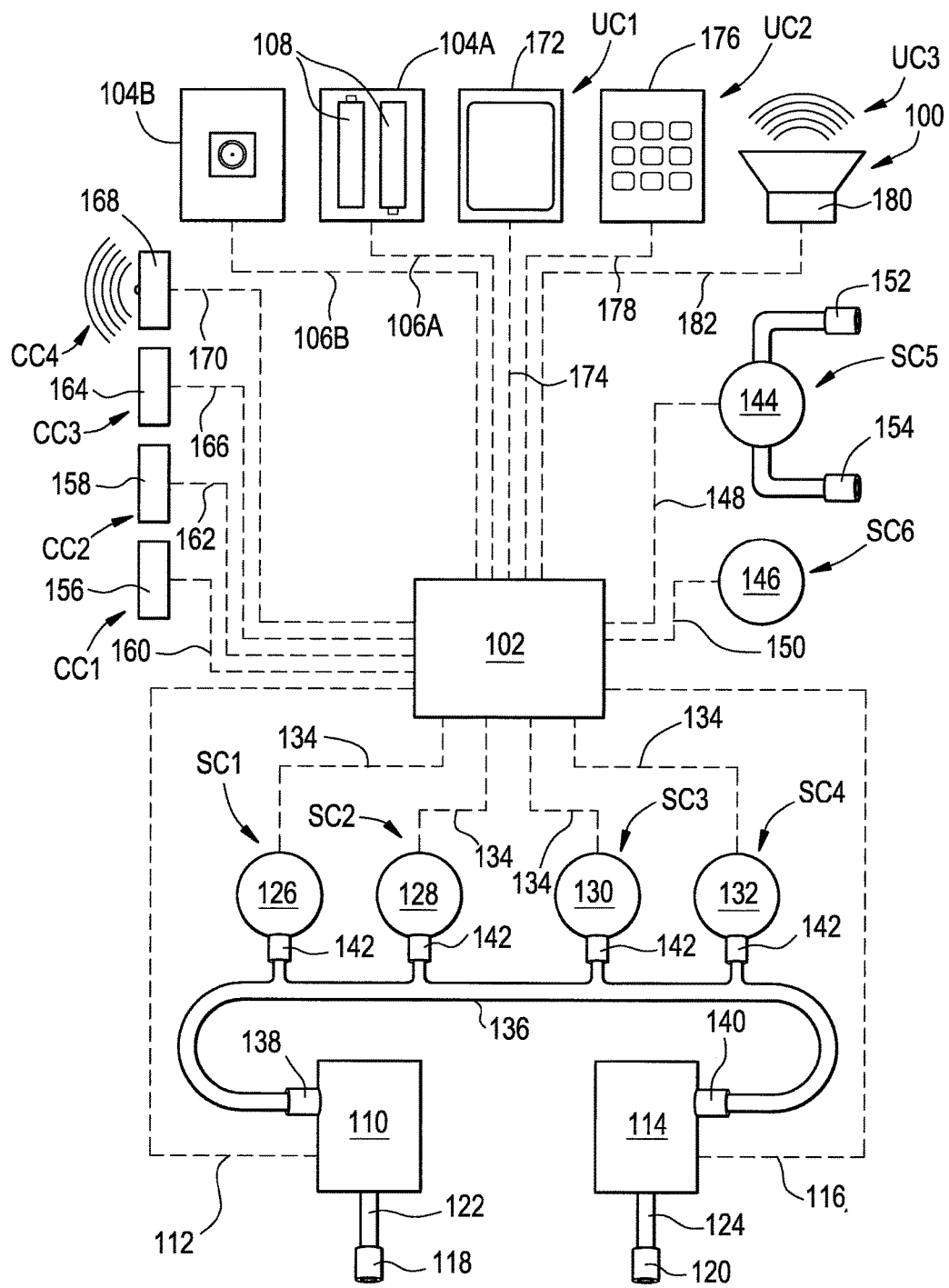
FIG. 1 is a schematic representation of one example of an analyzer and diagnostic system in accordance with the subject matter of the present disclosure.

FIG. 1 illustrates one example of an analyzer and diagnostic system 100 in accordance with the subject matter of the present disclosure. Generally, an analyzer and diagnostic system in accordance with the subject matter of the present disclosure, such as system 100, for example, can be operative to sample and/or measure properties and/or conditions of gases associated with combustion systems, analyze such gases as well as one or more properties and/or conditions thereof, and present combustion process diagnostics based at least in part on the results of the analysis. Non-limiting examples of such combustion systems can include heating systems (e.g., furnaces and/or boilers in light industrial, institutional, commercial and/or residential installations) and gas-fired appliances (e.g., commercial and/or residential hot water heaters).

Analyzer and diagnostic system 100 can include a controller 102 and at least one power supply connection that is communicatively coupled with the controller. In the arrangement in FIG. 1, for example, system 100 is shown as including power source connectors 104A and 104B that are communicatively coupled with controller 102, such as, for example, by way of electrical conductors or leads 106A and 106B, respectively. It will be appreciated that the one or more power source connectors can be configured for operative connection with one or more associated power sources of any suitable type, kind, configuration and/or arrangement. As one example, power source connector 104A, if provided, could be configured to receive and electrically connect one or more electrical power cells, such as batteries 108, for example. As another example, power source connector 104B, if provided, could be dimensioned to receivingly engage a connector from a remote power source (not shown), such as a connector (not shown) from a conventional AC power adapter (not shown) and/or a connector (not shown) from a conventional DC power source (not shown), such as a USB connector and/or a power-over-Ethernet connector, for example. In many cases, the system will include two power source connectors with one power source connector (e.g., connector 104A) dimensioned to be communicatively coupled with a direct-current power source (e.g., batteries 108) and the other power source connector (e.g., connector 104B) dimensioned to be communicatively coupled with an alternating-current power source, such as is shown in FIG. 1, for example.

System 100 can also include one or more gas displacement devices, such as may be selectively operated to transfer gases into and/or out of the system. It will be appreciated that one or more gas displacement devices of any suitable size, type, configuration and/or construction (or combinations thereof) could be used. For example, system 100 is shown in FIG. 1 as including a pump 110 that is communicatively coupled with controller 102, such as by way of an electrical conductor or lead 112, for example, and can be selectively operated to draw gases into the system and/or purge or otherwise evacuate gases from the system. In some cases, system 100 can also, optionally, include a pump 114 that is communicatively coupled with controller 102, such as by way of an electrical conductor or lead 116, for example, and can also be selectively operated to draw gases into the system and/or purge or otherwise evacuate gases from the system.

If two or more gas displacement devices are included, such devices can, in some cases, be operative to generate gas flow through one or more gas transfer lines (e.g., hoses) in a single or primary direction of flow. As one example of such a configuration, pump 110 could function as a sample pump that is operative to sample or otherwise draw combustion gases into the system and pump 114 could function as a purge pump that is operative to evacuate combustion gases from the system, such as by displacing the combustion gases using ambient atmospheric gas or other non-combustion system gas, for example. In such case, controller 102 can selectively energize or otherwise actuate pumps 110 and/or 114 to transfer gases into and out of the system.

It will be appreciated that the one or more gas displacement devices can be in fluid communication with one or more gas transfer lines (e.g., tubing and/or hose segments) and/or gas line connectors (e.g., tubing and/or hose fittings) in any suitable manner. For example, system 100 is shown in FIG. 1 as including gas line connectors 118 and 120 that are in fluid communication with pumps 110 and 114, respectively, such as by way of gas transfer lines 122 and 124, for example. Additionally, it will be appreciated that gas line connectors 118 and 120 can be of any suitable type, kind and/or configuration, such as may be suitable for forming a substantially fluid-tight connection with an external gas transfer line, hose, conduit or other gas transfer device, for example. In some cases, connector 120 can, optionally, take the form of a passage or opening that is dimensioned to fluidically communicate with the external atmosphere rather than being dimensioned to receivingly engage an associated connector. In this manner, connector 120 could, for example, function to exchange or otherwise transfer combustion gases and ambient air into and/or out of system 100.

An analyzer and diagnostic system in accordance with the subject matter of the present disclosure (e.g., system 100) can also include one or more sensing channels, such as may be suitable for measuring, identifying or otherwise determining one or more properties and/or characteristics of gases associated with combustion systems and/or the surrounding environment, and communicating signals, data, values and/or information having a relation to such one or more properties and/or characteristics to an associated control device. In the arrangement in FIG. 1, for example, system 100 is shown as including a plurality of sensing channels SC1, SC2, SC3, SC4, SC5 and SC6 that are operatively associated with controller 102. It will be appreciated, however, that any suitable number of one or more sensing channels can be used, such as a quantity of sensing channels within a range of from one (1) to fifty (50) sensing channels, for example.

It will be appreciated that the one or more sensing channels can take any suitable form and can be of any suitable type, kind and/or arrangement. For example, each sensing channel can include one or more devices, components and/or systems for measuring, identifying or otherwise determining one or more properties and/or characteristics of gases associated with combustion systems and/or the surrounding atmospheric conditions, which devices, components and/or systems will collectively be referred to herein as "sensors". Additionally, it will be appreciated that such sensors can be of any suitable type, kind, construction, configuration and/or arrangement. As non-limiting examples, one or more of the sensors that be of the type and/or kind that measure, identify or otherwise determine gas pressure, temperature and/or chemical compound concentrations.

In the arrangement shown in FIG. 1, sensing channels SC1-SC4 are shown as including sensors or sensing devices 126, 128, 130 and 132, respectively, that are communicatively coupled with controller 102 of system 100 by electrical conductors or leads 134. In a preferred arrangement, sensors 126-132 can be of the type and kind that are operative to measure or otherwise determine the presence and/or concentration of a particular chemical compound or group of chemical compounds, such as may be present in combustion gases, for example. Non-limiting examples of particular chemical compounds or groups of chemical compounds that could be measured or otherwise sensed by sensors 126-132 can include carbon monoxide (CO), oxygen ($O_2$), hydrocarbon (methane-based) combustibles (HC), nitric oxide (NO), nitrogen dioxide ($NO_2$) and sulfur dioxide ($SO_2$).

Additionally, in some cases, two or more sensors that are operative to measure or otherwise determine properties and/or characteristics of a common chemical compound or common group of chemical compounds can be included. For example, two or more sensors that have different ranges of sensitivity could be used, such as may be used to measure or otherwise determine concentration levels of a particular compound within either a first range (e.g., from approximately zero parts per million (ppm) to approximately 4,000 ppm) or a second range (e.g., from approximately 4,000 ppm to approximately 20,000 ppm), for example.

One or more of the sensing channels of a system in accordance with the subject matter of the present disclosure, such as system 100, for example, can be operatively associated with gases transferred into, out of and/or otherwise through the system in any suitable manner. For example, sensing channels SC1-SC4 can be operatively associated with gases transferred into, out of and/or otherwise through system 100 by pumps 110 and/or 114 in any suitable manner, such as by way of one or more gas transfer lines (e.g., one or more lengths or sections of tubing or hose). In the arrangement in FIG. 1, for example, a gas transfer line 136 is disposed in fluid communication between connectors 138 and 140 of pumps 110 and 114, respectively. Sensors 126-132 are shown as including gas line connectors 142 that are connected in a substantially fluid-tight manner with gas transfer line 136 such that sensors 126-132 are in fluid communication with gases flowing through gas transfer line 136. It will be appreciated that two or more sensors of a system in accordance with the subject matter of the present disclosure, such as sensors 126-132 of system 100, for example, can be disposed in fluid communication with one another in any suitable manner. In some cases, for example, two or more sensors could be connected in series with one another such that gases flowing through the system can flow into and through a first or upstream sensor and then subsequently into and through a second or downstream sensor. In other cases, two or more sensors could be connected in parallel with one another, such as is shown in FIG. 1, for example. In still other cases, three or more sensors could be disposed in fluid communication with one another through a combination of series and parallel connections.

Sensing channels SC5 and SC6 are shown as including sensors 144 and 146, respectively, that are communicatively coupled with the controller by electrical conductors or leads 148 and 150, respectively. In a preferred arrangement, sensor 144 can be of the type and kind that is operative to measure or otherwise determine gas pressure, such as a gas pressure level and/or a gas pressure differential, for example. In some cases, sensor 144 can include gas line connectors 152 and 154 with at least one of the gas line connectors being suitable for forming a substantially fluid-tight connection with an external gas transfer line, hose, conduit or other gas transfer device. In some cases, gas line connectors 152 and 154 can be fluidically connected on operatively opposed sides of sensor 144 such that relative differential pressures can be measured, such as may occur between a gas pressure acting on or otherwise communicated through gas line connector 152 and a gas pressure acting on or otherwise communicated through gas line connector 154, for example. Additionally, sensor 146 can be of the type and kind that is operative to measure or otherwise determine a temperature, such as an ambient temperature, for example. It will be appreciated, however, that sensors of any other suitable type, kind, configuration and/or construction could alternately be used.

The one or more sensors of a system in accordance with the subject matter of the present disclosure, such as sensors 126-132, 144 and 146 of system 100, for example, can be operative to output or otherwise generate signals, data, values and/or information corresponding or otherwise having a relation to the one or more properties and/or characteristics of the gases and/or conditions that are being measured, identified or otherwise determined by a given sensor. It will be appreciated that such signals, data, values and/or information can be transmitted or otherwise communicated to, from and/or between a sensor and the controller in any suitable manner, such as by way of analog signals and/or digital communications, for example. As one non-limiting example, one or more of sensors 126-132 could transmit or otherwise communicate analog signals and/or digital messages to controller 102 corresponding to the presence and/or concentration of a particular chemical compound or group of chemical compounds, such as may be present in combustion gases, for example. As another non-limiting example, sensor 144 could transmit or otherwise communicate analog signals and/or digital messages to controller 102 corresponding to a differential gas pressure between gas line connectors 152 and 154. As a further non-limiting example, sensor 146 could transmit or otherwise communicate analog signals and/or digital messages to controller 102 corresponding or otherwise having a relation to an ambient temperature to which system 100 may be exposed.

An analyzer and diagnostic system in accordance with the subject matter of the present disclosure (e.g., system 100) can also include one or more communication channels, such as may be suitable for sending, receiving or otherwise communicating signals, data, values and/or information with one or more external devices, components and/or systems with which the analyzer and diagnostic system may be associated. In the arrangement in FIG. 1, for example, system 100 is shown as including a plurality of communication channels CC1, CC2, CC3 and CC4 that are operatively associated with controller 102. It will be appreciated, however, that any suitable number of one or more communication channels can be used, such as a quantity of communication channels within a range of from one (1) to twenty (20) communication channels, for example.

It will be appreciated that the one or more communication channels can take any suitable form and can be of any suitable type, kind, configuration and/or arrangement. For example, each communication channel can include one or more connectors or interfaces for communicating with an associated or otherwise external device, component and/or system. Non-limiting examples of such connectors and/or interfaces can include wired analog connectors (e.g., thermocouple connectors, pressure transducer connectors), wired digital connectors (e.g., USB connectors, Ethernet connectors, FireWire connectors), and wireless communication interfaces (e.g., IR transceivers, Bluetooth transceivers, local and/or wide area network interfaces, optical readers, barcode readers, radio frequency identification (RFID) readers).

In the arrangement in FIG. 1, for example, communication channels CC1 and CC2 can, if provided, include connectors 156 and 158 that are communicatively coupled with controller 102 in a suitable manner, such as by way of electrical conductors or leads 160 and 162, respectively. In some cases, connectors 156 and/or 158 can take the form of wired analog connectors, such as, for example, may be suitable for operatively engaging external temperature and/or pressure sensors. As one non-limiting example, connector 156 can be used to communicate with a thermocouple for monitoring the temperature of ambient air at a remote location, and connector 158 can be used to communicate with a thermocouple for monitoring the temperature of combustion gases within a chamber, passage or conduit of a combustion system.

Additionally, or in the alternative, communication channel CC3 can, if provided, include a connector 164 that is communicatively coupled with controller 102 in a suitable manner, such as by way of an electrical conductor or lead 166, for example. In some cases, connector 164 can take the form of a wired digital connector, such as, for example, may be suitable for operatively engaging a USB connector to transfer data between a remote device (e.g., a personal computer) and system 100. As one non-limiting example, the wired communication connector could be used to communicate with a personal computer or a computer network server, such as to acquire or otherwise obtain one or more specifications and/or operating parameters of a combustion appliance or system.

Additionally, or as a further alternative, communication channel CC4 can, if provided, include an interface 168 that is communicatively coupled with controller 102 in a suitable manner, such as by way of an electrical conductor or lead 170, for example. In some cases, interface 168 can take the form of a wireless communication interface, such as, for example, may be suitable for transmitting and/or receiving data and/or information from a remote device (e.g., a combustion appliance or system, a personal computer, a computer network server and/or a printer). As one non-limiting example, the wireless communication interface can be used to communicate with a combustion appliance and/or system, such as to acquire or otherwise obtain one or more specifications and/or operating parameters from the combustion appliance or system. As another non-limiting example, the wireless communication interface could be used to communicate with a personal computer or a computer network server, such as to acquire or otherwise obtain one or more specifications and/or operating parameters of a combustion appliance or system.

An analyzer and diagnostic system in accordance with the subject matter of the present disclosure (e.g., system 100) can also include one or more user communication channels, such as may be suitable for receiving inputs from, conveying outputs to or otherwise communicating with a user or operator of the system. In the arrangement in FIG. 1, for example, system 100 is shown as including a plurality of user communication channels UC1, UC2 and UC3 that are operatively associated with controller 102. It will be appreciated, however, that any suitable number of one or more user communication channels can be used, such as a quantity of user communication channels within a range of from one (1) to ten (10) user communication channels, for example.

It will be appreciated that the one or more user communication channels can take any suitable form and can be of any suitable type, kind, configuration and/or arrangement. For example, a user communication channel can include an input device, such as may be suitable from receiving one or more inputs from a user or operator, or an output device, such as may be suitable for conveying one or more outputs to a user or operator. As another example, a user communication channel can include a device, component and/or system that operates as both an input device and an output device. Non-limiting examples of user communication devices can include tactile input devices (e.g., keyboards, keypads and/or pointing devices), audible output devices (e.g., speakers), graphical output devices (e.g., display screens) and graphical input/output devices (e.g., capacitive and/or resistive touch screens).

In the arrangement in FIG. 1, for example, user communication channel UC1 can include a visual communication device 172 that is communicatively coupled with controller 102 in a suitable manner, such as by way of an electrical conductor or lead 174. In some cases, visual communication device 172 can take the form of a graphical input/output device, such as a capacitive or resistive touch screen, for example. In which case, additional user input devices can, optionally, be omitted. In other cases, visual communication device 172 can take the form of a graphical output device, such as a conventional display screen, for example. In such case, one or more additional user input devices can be included. For example, user communication channel UC2 can include a tactile input device 176, such as a keyboard or a keypad, for example, that is communicatively coupled with controller 102 in a suitable manner, such as by way of an electrical conductor or lead 178. In some cases, user communication channel UC3 may be provided and can include an audible output device 180, such as a speaker, for example, that is communicatively coupled with controller 102 in a suitable manner, such as by way of an electrical conductor or lead 182. As one non-limiting example, visual communication device 172 (e.g., a capacitive or resistive touch screen) and/or tactile input device 176 can be used to input one or more specifications and/or operating parameters of a combustion appliance or system into system 100, and visual communication device 172 can be used to display data or otherwise visually present and/or information associated with gases and/or conditions being measured as well as with combustion process diagnostics to a technician or user.

Figure 2:
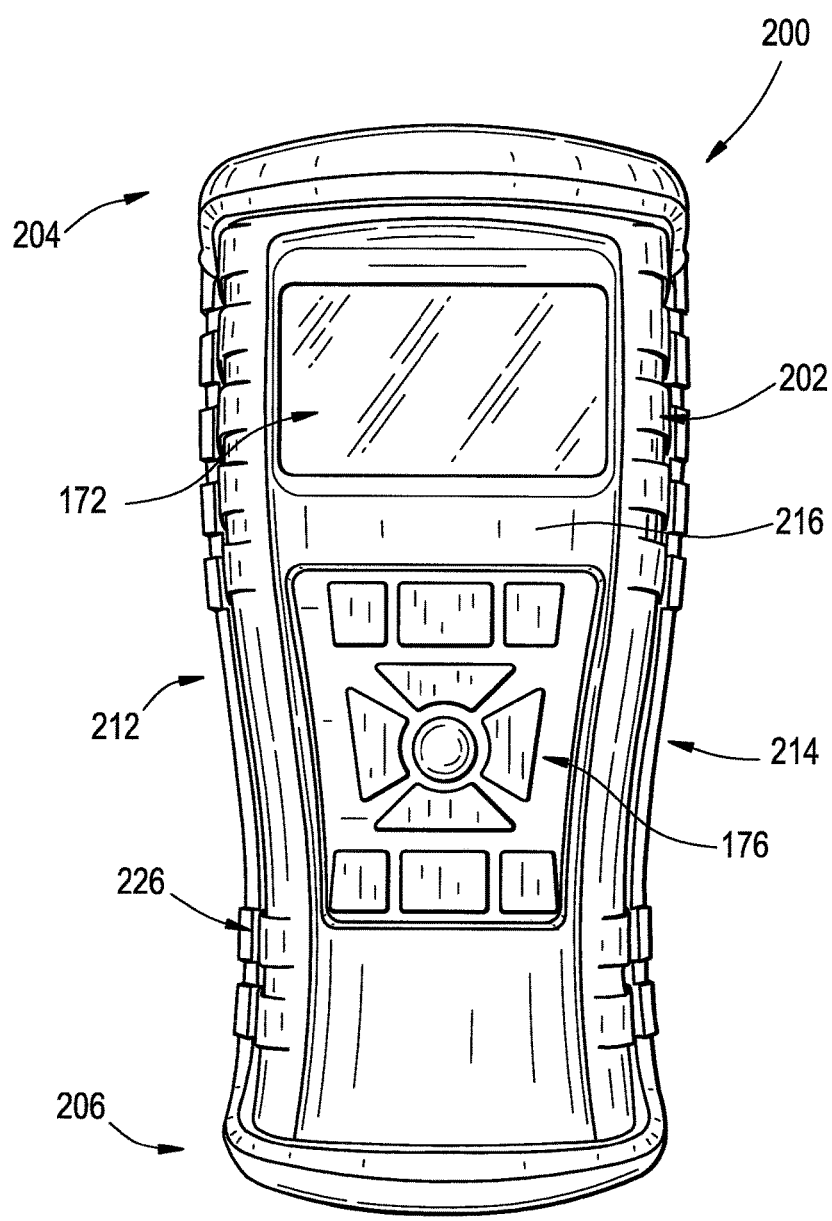
FIG. 2 is a front view of one example of an analyzer and diagnostic instrument in accordance with the subject matter of the present disclosure.
Figure 3:
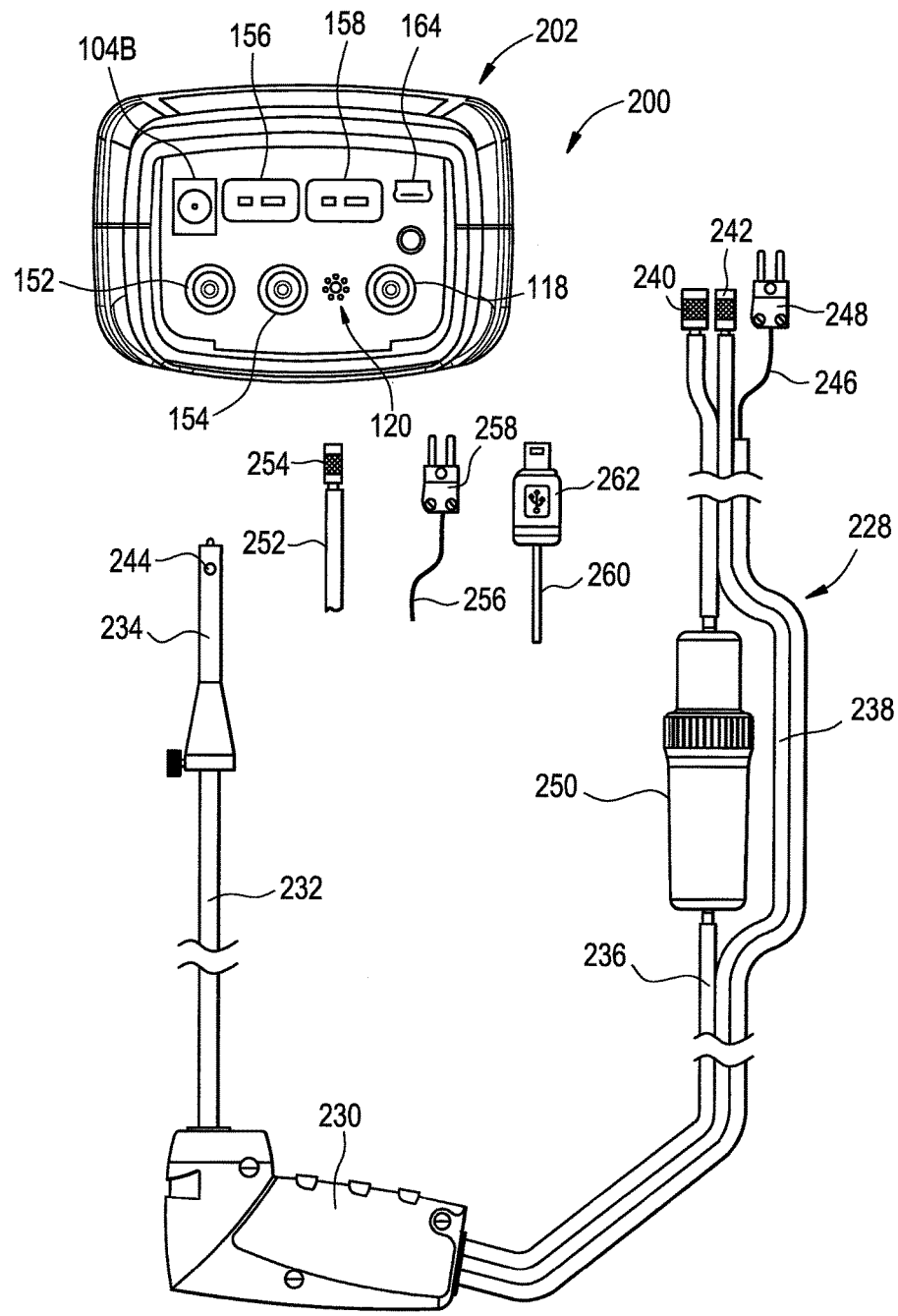
FIG. 3 is an end view of the instrument in FIG. 2 shown together with a sample probe and various input connectors prior to connection with the instrument.
Figure 4:
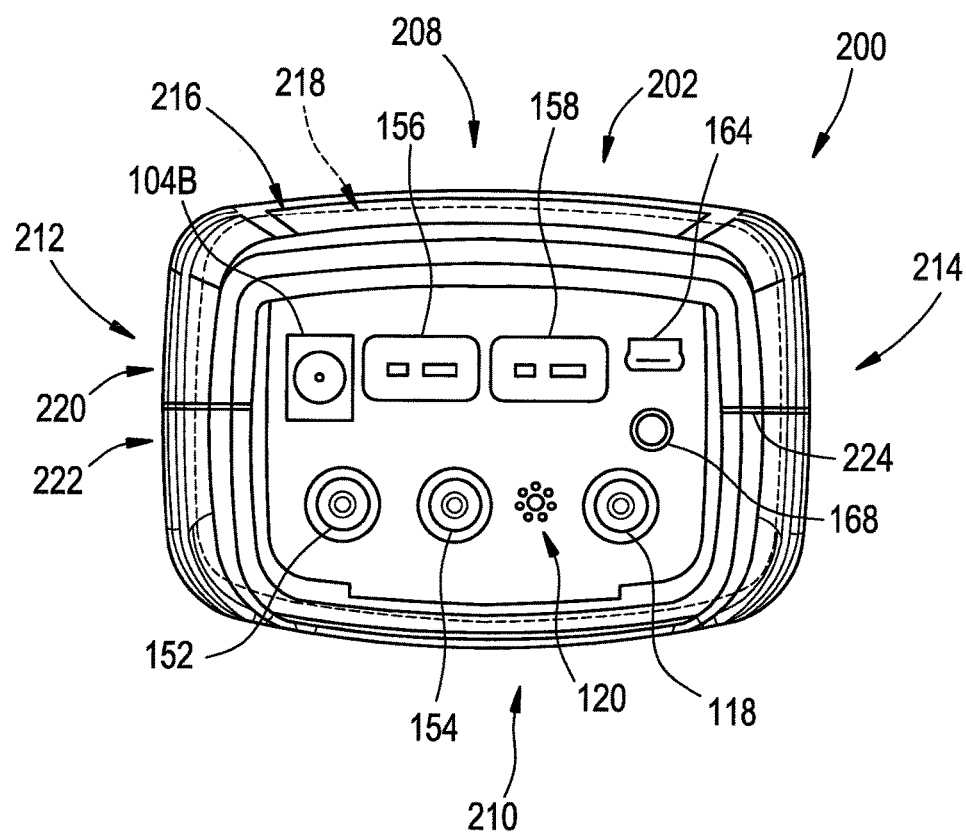
FIG. 4 is an enlarged end view of the instrument shown in FIGS. 2 and 3.

It will be appreciated that an analyzer and diagnostic system in accordance with the subject matter of the present disclosure, such as system 100, for example, can be packaged or otherwise embodied in any suitable configuration, arrangement and/or construction. As one non-limiting example, FIGS. 2-4 illustrate an analyzer and diagnostic instrument 200 in the form of a portable, hand-held instrument that includes analyzer and diagnostic system 100. As such, reference is made in FIGS. 2-4 to those components, elements and features of system 100 described above in connection with FIG. 1.

Instrument 200 is shown in FIGS. 2-4 as including a housing 202 that extends longitudinally between opposing ends 204 and 206. Housing 202 also includes a front 208, a back 210 and opposing sides 212 and 214. Housing 202 includes at least one housing wall that at least partially forms a housing cavity dimensioned to receive one or more systems, components and/or devices of instrument 200, such as the components and devices of system 100, for example. In the configuration shown in FIGS. 2-4, housing 202 includes a housing wall 216 that at least partially forms a housing cavity, which is represented in FIG. 4 by dashed line 218. In the exemplary arrangement shown in FIGS. 2-4, housing wall 216 includes two housing sections 220 and 222 that come together at a joint or seam 224 and together at least partially define housing cavity 218. In some cases, an outer cover 226 (FIG. 2) can extend along one or more portions of the house wall, such as, for example, to provide additional protection for the instrument and/or to provide one or more ergonomic features for use of the instrument.

Instrument 200 can also include one or more sensing channels, one or more communication channels and/or one or more user communication channels, such as, for example, have been described above in connection with system 100 in FIG. 1. In the arrangement shown in FIGS. 2-4, for example, instrument 200 is shown as including visual communication device 172 and tactile input device 176, which are accessible from along front 208 of housing 202. It will be appreciated, however, that other configurations and/or arrangements could alternately be used.

Instrument 200 can also include one or more connectors, such as may be operatively associated with one or more sensing channels and/or communication channels (e.g., one or more of sensor channels SC1-SC6 and/or CC1-CC4), and/or other elements and/or components of system 100. In the arrangement in FIGS. 3 and 4, for example, instrument 200 is shown as including power source connector 104B, which may be accessible from along end 206 of housing 202. Additionally, instrument 200 is shown as including connectors 118, 120, 152 and 154, which are also shown as being accessible from along end 206 of housing 202. Instrument 200 is further shown as including connectors 156, 158 and 164 that are accessible from along end 206 of housing 202. In some cases, instrument 200 may include interface 168, which can be accessible from along end 204 of housing 202. Additionally, instrument 200 may, in some cases, include connector 104A, which can be accessible by way of a conventional access panel or cover (not shown) along back 210, for example. One or more of the remaining components, devices and/or systems of system 100 as well as other elements can be supported within housing cavity 218 in a suitable manner.

In some cases, instrument 200 can form the basis of a kit, such as may include one or more external devices, components and/or systems. As one example, instrument 200 is shown in FIG. 3 in association with a hose and probe assembly 228 that includes a handle 230, an elongated probe tube 232 that extends from a proximal end (not numbered) adjacent the handle to a distal end (not numbered) that supports a probe tip 234. Assembly 228 can also include one or more gas transfer lines and/or one or more electrical conductors or leads. In some cases, the one or more gas transfer lines may be suitable for transferring or otherwise communicating combustion gas samples and/or the properties or characteristics thereof to a system, such as system 100, for example, of an instrument, such as instrument 200, for example. Additionally, or in the alternative, the one or more electrical conductors or leads can communicate signals, data and/or information corresponding to properties and/or conditions associated with the combustion gas samples. In some cases, such signals, data and/or information could be output or otherwise generated by a sensor or sensing device on or along probe tip 234. As one example, probe tip 234 could act as or otherwise include a thermocouple suitable for measuring combustion gas temperatures.

In the arrangement shown in FIG. 3, a gas transfer lines 236 and 238 (e.g., hoses or tubes) extend between handle 230 and gas line connectors 240 and 242, respectively. In a preferred arrangement, gas line connectors 240 and 242 are cooperative with one or more of connectors 118, 152 and/or 154 such that a substantially fluid-tight seal can be formed therebetween. Typically, probe tube 232 includes one or more passages (not shown) extending lengthwise therethrough that is/are in fluid communication with probe tip 234, which can include one or more sampling ports 244, such that combustion gas samples can be drawn into assembly 228 or otherwise into the system. The one or more passages of probe tube 232 can be in fluid communication with one or more of gas transfer lines 236 within handle 230. Additionally, assembly 228 is shown as including an electrical conductor 246 that extends from handle 230 to a connector 248. In a preferred arrangement, electrical conductor 246 is communicatively coupled with a sensor located near or a sensing feature of probe tip 234, and signals, data and/or information from the sensor or sensing feature are communicated through electrical conductor 246 to connector 248, which is preferably dimensioned to communicatively engage one of connectors 156 and/or 158.

As illustrated in FIG. 3, assembly 228 can also include one or more additional components, such as one or more gas filters (not shown), for example. In the arrangement in FIG. 3, for example, assembly 228 is shown as including a water trap and filter assembly 250 connected in fluid communication along gas line connector 240, such as may be suitable for removing or at least reducing combustion gas condensates and/or for reducing soot and/or other contaminants from reaching internal components of system 100, such as may at least partially form instrument 200, for example. As an additional or alternate example, instrument 200 is shown in FIG. 3 in association with a gas transfer line 252 that terminates at a gas line connector 254, such as may be cooperative with one or more of connectors 118, 152 and/or 154 such that a substantially fluid-tight seal can be formed therebetween. In some cases, gas transfer line 252 can be used cooperatively with gas transfer line 238, such as to measure differential gas pressure across a combustion chamber or to measure draft within a combustion gas passage, for example. As a further or alternate example, instrument 200 is shown in FIG. 3 in association with a conductor 256 that terminates at a connector 258, which can be dimensioned to communicatively engage one of connectors 156 and/or 158. In some cases, conductor 256 can be operatively associated with an external sensor, such as a thermocouple, for example, and can communicate signals, data, values and/or information from the external sensor to system 100. As still a further or alternate example, instrument 200 is shown in FIG. 3 in association with a conductor 260 that terminates at a connector 262, which can be dimensioned to communicatively engage connector 164. In some cases, conductor 260 can be operatively associated with an external computing device, such as a personal computer, for example, and can be operative to communicate or otherwise transfer signals, data, values and/or information to, from and/or otherwise between the personal computer and system 100.

Figure 5:
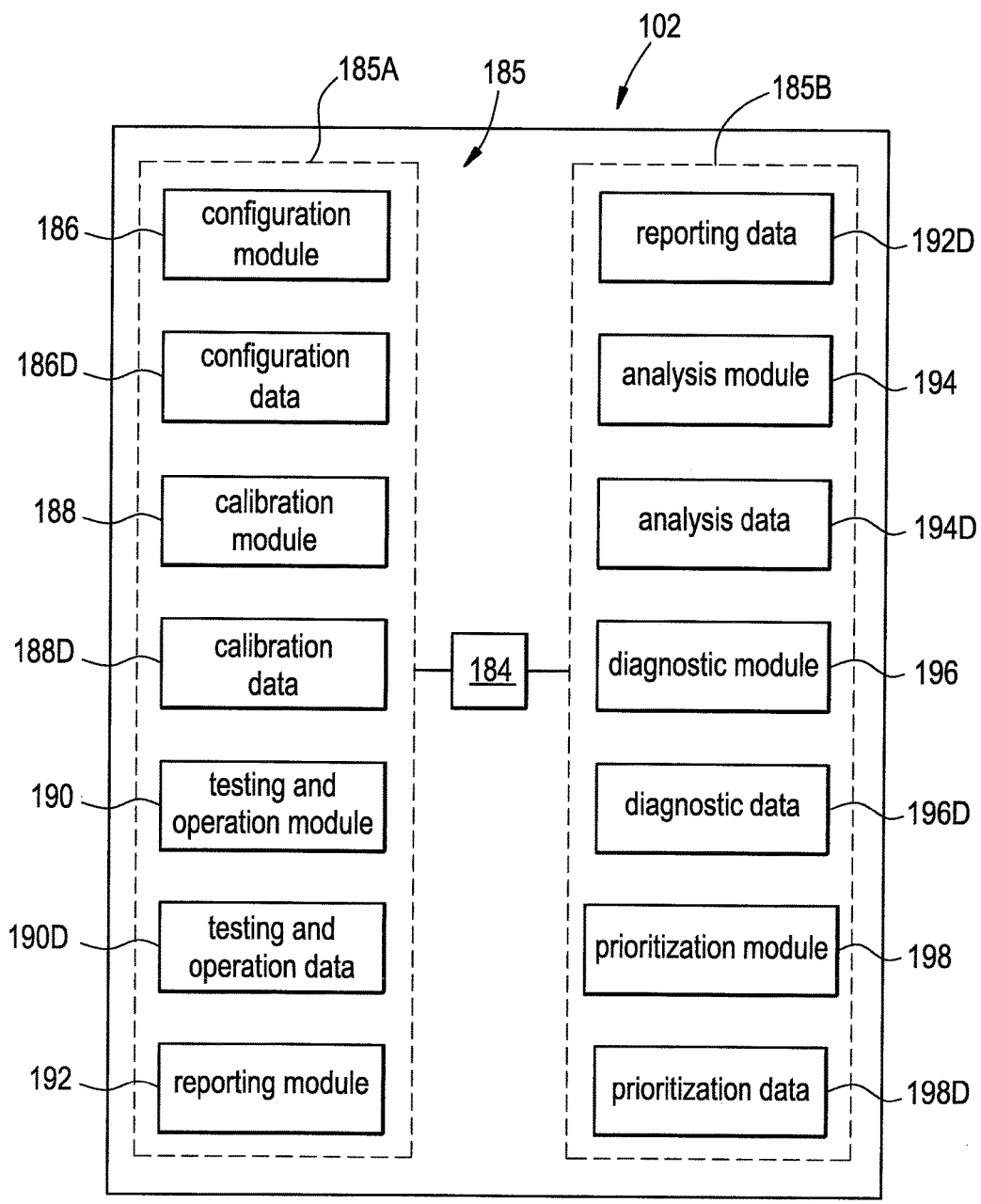
FIG. 5 is a schematic representation of one example of a control unit for an analyzer and diagnostic system in accordance with the subject matter of the present disclosure.

With reference, now, to FIGS. 1 and 5, controller 102 is shown as being in communicatively coupled with various devices and components of system 100, such as may be suitable for sending, receiving and/or otherwise communicating signals, data, values and/or information to, from and/or otherwise between the controller and one or more of the devices and/or components of the system. It will be appreciated that controller 102 can include any suitable hardware, software and/or combination thereof for configuration and operation of an analyzer and diagnostic system in accordance with the subject matter of the present disclosure. For example, controller 102 can include a processing device, which can be of any suitable type, kind and/or configuration, such as a microprocessor, for example, for processing data, executing software routines/programs, and other functions relating to the performance and/or operation of system 100. Additionally, the controller can include a memory of any suitable type, kind and/or configuration that can be used to store software, parameters, settings, inputs, data, values and/or other information for use in association with the performance and/operation of system 100. In the arrangement shown in FIG. 5, controller 102 includes a microprocessor 184 and a memory 185, which is represented by boxes 185A and 185B.

Controller 102, as is shown in FIG. 5, can, optionally, include a configuration module 186 that is capable of requesting, receiving, processing, storing and/or otherwise transferring data, values, information, signals and/or communications into and/or out of system 100, such as may relate to or be otherwise associated with the setup, configuration and operational parameters of system 100. In some cases, configuration module 186 can request, receive, process and/or store data, values, information, signals and/or communications input by a user, such as by way of visual communication device 172 and/or tactile input device 176. In other cases, configuration module 186 could receive or otherwise transfer data, values, information, signals and/or communications from a remote device, such as a personal computer or a computer network server, for example, such as by way of one of connector 164 and/or interface 168 of communication channels CC3 and/or CC4, for example. Non-limiting examples of inputs and selections to which the data, values, information, signals and/or communications could relate can include combustion fuel type, auto/manual carbon monoxide (CO) zero setting, temperature units, pressure units, pollution units, date, time, oxygen ($O_2$) reference settings, print pressure settings, display settings, data logging settings, sound settings, test identification information, user name, default language, calibration reminder period, and screen format settings. The data, values, information, signals and/or communications requested, received, processed or otherwise transferred into system 100 can be stored in memory 185, such as is represented by box 186D in FIG. 5.

Controller 102, as is shown in FIG. 5, can also, optionally, include a calibration module 188 that is capable of receiving, processing, storing and/or otherwise transferring data, values, information, signals and/or communications into and/or out of system 100 that may relate to or be otherwise associated with the setup, configuration and/or calibration of one or more sensors or sensing devices (e.g., sensors 126-132, 144 and/or 146) of system 100. In some cases, calibration module 188 can receive, process and/or store data, values, information, signals and/or communications input by a user, such as by way of visual communication device 172 and/or tactile input device 176. In other cases, calibration module 188 could receive or otherwise transfer data, values, information, signals and/or communications from a remote device, such as a personal computer or a computer network server, for example, such as by way of one of connector 164 and/or interface 168 of communication channels CC3 and/or CC4, for example. Non-limiting examples of sensors to which calibration data, information, signals and/or communications could relate can include pressure sensors, combustion gas temperature sensors, ambient air temperature sensors, low-level carbon monoxide ($CO_{LOW}$) sensors, high-level carbon monoxide ($CO_{HIGH}$) sensors, oxygen ($O_2$), sulfur dioxide ($SO_2$) sensors, nitric oxide (NO) sensors, nitrogen dioxide ($NO_2$) sensors, and/or hydrocarbon (methane-based) combustibles (HC). The data, values, information, signals and/or communications received, processed or otherwise transferred into system 100 can be stored in memory 185, such as is represented by box 188D in FIG. 5.

Controller 102, as is shown in FIG. 5, can further, optionally, include a testing and operation module 190 that is capable of receiving, processing, storing and/or otherwise transferring data, values, information, signals and/or communications into and/or out of system 100 relating to or otherwise associated with the sampling of combustion gases as well as properties and characteristics associated with the corresponding combustion system and/or ambient atmospheric conditions. In a preferred arrangement, testing and operation module 190 is also capable of selectively operating and/or otherwise communicating with one or more devices and/or components of system 100. Non-limiting examples of such one or more devices and/or components can include one or more of pumps 110 and 114, sensors 126-132, 144 and 146, as well as connections 156-164 and/or interface 168.

In some cases, testing and operation module 190 can receive, store and/or transfer into system 100 data, values and/or information relating to one or more properties and/or characteristics associated with a corresponding combustion appliance and/or system. In some cases, testing and operation module 190 can receive and store data, values and/or information corresponding to one or more specifications and/or operating parameters of combustion appliances and/or systems. In such cases, the data and/or information may be utilized to diagnose or otherwise at least partially determine one or more operating conditions of a combustion appliance or system. Additionally, in some cases, testing and operation module 190 can also receive, store and/or otherwise transfer into system 100 one or more logic algorithms. In some cases, the one or more logic algorithms may correspond to a particular category of combustion appliances and/or systems, such as may be broadly grouped together by type, kind and/or configuration of combustion appliances and/or systems, for example. In other cases, the one or more logic algorithms may relate to a specific combustion appliance, system or family of combustion appliances or systems, such as may correspond to a particular model or family of products from a particular manufacturer, for example. Additionally, or in the alternative, the one or more logic algorithms may be operative to report to a technician or user any number of one or more operating conditions that are inside and/or outside of the specifications and/or operating parameters for those one or more operating conditions along with the possible causes and/or recommended corrective actions.

As one non-limiting example, the user could input specific combustion system information (e.g., appliance model, serial number, type of combustion system) via an input device, and testing and operation module 190 could retrieve corresponding specifications, operating parameters and/or logic algorithms from memory which correspond to the specific combustion appliance or system being tested. As another non-limiting example, the user could utilize a communication interface (e.g., a barcode reader, an RFID reader, a Bluetooth radio) to identify a specific combustion appliance or system, and testing and operation module 190 could retrieve corresponding specifications, operating parameters and/or logic algorithms from memory which correspond to the identified combustion system. It should be appreciated that testing and operation module 190 can, in some cases, store or otherwise retain in memory various generic and specific combustion appliance and/or system specifications, operating parameters and/or logic algorithms. If testing and operation module 190 is unable to retrieve from memory the specifications, operating parameters and/or logic algorithms for the identified combustion appliance or system, testing and operation module 190 can, in some cases, receive the corresponding specifications, operating parameters and/or logic algorithms via a communication channel, such as through one or more of communication channels CC1-CC4 (e.g., through one or more of connectors 156, 158, 164 and/or 168). For example, testing and operation module 190 could utilize local and/or wide area networks to download or otherwise transfer into system 100 the specifications, operating parameters and/or logic algorithms of an identified combustion appliance and/or system, such as, for example, may be accessible from a database stored on a remote computer or network server via the Internet. Additionally, or in the alternative, it will be appreciated that a user can utilize one or more input devices to manually enter and/or select suitable specifications, operating parameters and/or logic algorithms for an identified combustion appliance or system.

In some cases, testing and operation module 190 can selectively operate pump 110 to draw combustion gas samples into system 100 and fluidically communicate the combustion gas samples to one or more of sensors 126-132 and/or 144. Additionally, or in the alternative, testing and operation module 190 can selectively operate pump 114 to purge combustion gas samples from system 100, such as by flushing one or more of sensors 126-132 and/or 144 with non-combustion gas (e.g., ambient air). Furthermore, testing and operation module 190 can receive, process and/or store data, information, signals and/or communications received from one or more of sensing channels SC1-SC6 (e.g., from one or more of sensors 126-132, 144 and/or 146) as well as from one or more of communication channels CC1-CC4 (e.g., from one or more of connectors 156, 158, 164 and/or interface 168). Non-limiting examples of data, values, information, signals and/or communications that can be received, processed and/or stored by testing and operation module 190 can include gas pressure level, differential pressure measurements, combustion gas temperature, ambient air temperature, the presence and/or concentration of chemical compounds, such as carbon monoxide (CO), oxygen ($O_2$), sulfur dioxide ($SO_2$), nitric oxide (NO), nitrogen dioxide ($NO_2$), and/or hydrocarbon (methane-based) combustibles (HC). The data, information, signals and/or communications received, processed or otherwise transferred into system 100 can be stored in memory 185, such as is represented by box 190D in FIG. 5.

Additionally, in some case, testing and operation module 190 can selectively utilize one or more features and/or components of system 100 to determine if the combustion appliance or system is operating at at least an approximately steady state condition. It will be appreciated that such a determination can be performed or otherwise achieved in any suitable manner. As one example, testing and operation module 190 can receive, process and/or store data, information, signals and/or communications received from one or more of sensing channels SC1-SC6 (e.g., from one or more of sensors 126-132, 144 and/or 146). Testing and operation module 190 can also determine a time rate of change (i.e., a derivative function with respect to time) for one or more operating parameters and/or combustion gas conditions. Testing and operation module 190 can compare the time rate of change of the one or more operating parameters and/or combustion gas conditions to one or more corresponding threshold values. Upon determining that one or more of such operating parameters and/or combustion gas conditions is changing with respect to time at a rate exceeding the corresponding threshold value, testing and operation module 190 can communicate to a user or operator that the combustion appliance or system may not be in condition for testing, such as by triggering visual and/or audible communications to the user or operation using one or more of user communication channels UC1, UC2 and/or UC3, for example. Additionally, or in the alternative, testing and operation module 190 could deactivate the current test procedure (or provide the user or operator an opportunity to do so) and wait until the combustion appliance or system has had time to reach a steady state operating condition. At which time, the user or operator could initiate a new test procedure during which testing and operation module 190 could confirm that a steady state operating condition of the combustion appliance or system has been reached.

In some cases, testing and operation module 190 could retrieve time-rate-of-change functions, logic algorithms and/or threshold values stored in memory 185, such as is represented by box 190D, for example. In some cases, the functions, logic algorithms and/or threshold values can correspond to the specific combustion appliance or system being tested. In other cases, the functions, logic algorithms and/or threshold values can be predetermined functions, algorithms and/or values that are independent of the particular combustion appliance or system being tested. As one non-limiting example, a function of:

$$\frac{dT}{dt} \leq X$$

could be used where T represents temperature of the stack or flue of the combustion appliance or system, and X represents a predetermined threshold value that is greater than zero. As another non-limiting example, a function of:

$$\frac{dCO}{dt} \leq Y$$

could be used where CO represents a carbon monoxide level associated with the combustion appliance or system, and Y represents a predetermined threshold value that is greater than zero. As a further non-limiting example, a function of:

$$\frac{dO_2}{dt} \leq Z$$

could be used where $O_2$ represents an oxygen level associated with the combustion appliance or system, and Z represents a predetermined threshold value that is greater than zero. Additionally, the steady state determination could be performed by testing and operation module 190 over a predetermined duration or timeout period. As a non-limiting example, a function of:

$$t \leq W$$

could be used where t represents an predetermined duration or timeout period, and W represents a predetermined threshold value that is greater than zero.

Controller 102, as is shown in FIG. 5, can also, optionally, include a reporting module 192 that is capable of generating, processing, storing and/or transferring data, values, information, signals and/or communications into and/or out of system 100 relating to or otherwise associated with the testing of combustion gases by system 100. In some cases, reporting module 192 can access, process and/or format data, values, information, signals and/or communications stored by controller 102 during the performance of one or more combustion gas tests. Additionally, in some cases, reporting module 192 can generate printable reports, visually displayable records and/or computer-readable data files that include data, information, signals and/or communications associated with such one or more combustion gas tests. Furthermore, in some cases, reporting module 192 can output or otherwise communicate the printable reports to an associated printer, such as by way of wireless communication interface 168, for example. Further still, in some cases, reporting module 192 can output or otherwise communicate the visually displayable records to an associated visual communication device (e.g. device 172), and/or can output or otherwise communicate the computer-readable data files to an associated computing device (e.g., a personal computer), such as by way of wireless communication interface 168 and/or by way of connector 164, conductor 260 and connector 262, for example. The data, values and/or information relating to the formatting, generation and/or transmission of reports can be stored in memory 185, such as is represented by box 192D in FIG. 5.

Controller 102, as is shown in FIG. 5, can also, optionally, include an analysis module 194 that is capable of processing and storing data, values, information, signals and/or communications relating to or otherwise associated with the testing of combustion gases by system 100. In some cases, analysis module 194 can access, process and/or otherwise analyze data, values, information, signals and/or communications stored by controller 102 during the performance of one or more combustion gas tests. In other cases, analysis module 194 can utilize the stored data, values, information, and/or communications associated with the testing of combustion gases together with the specifications and/or operating parameters of the combustion system being tested to determine one or more operating conditions of the combustion system. For example, analysis module 194 can compare measured and/or calculated properties and/or characteristics of combustion gases associated with the testing of the combustion appliances and/or systems from predetermined levels, such as may, in some cases, be derived from the specifications and/or operating parameters, to determine one or more operating conditions of the combustion apparatus or system. Additionally, in some cases, reporting module 192 can be used to generate printable reports, visually displayable records and/or computer-readable data files that include data and/or information generated by analysis module 194. Non-limiting examples of properties, characteristics and/or conditions that can be generated or otherwise determined by analysis module 194 can include combustion efficiency, excess air levels, carbon dioxide ($CO_2$) levels, combined nitric oxide/nitrogen dioxide ($NO_x$) levels and/or pollution conversions. The data and/or information generated by analysis module 194 can be stored in memory 185, such as is represented by box 194D in FIG. 5.

Controller 102, as is shown in FIG. 5, can further include a diagnostic module 196 that is capable of retrieving, processing, storing and communicating data, values, information, signals and/or communications into and/or out of system 100 that may relate to deviations of measured and/or calculated properties and/or characteristics of combustion gases from predetermined levels, as well as possible causes and recommended corrective actions (e.g., adjustments to the combustion appliance or system) that can be taken. For example, diagnostic module 196 can compare the measured and/or calculated properties and/or characteristics of combustion gases with the predetermined levels and utilize one or more logic algorithms to determine possible causes and recommended corrective actions. In a preferred arrangement, diagnostic module 196 will access, process and/or otherwise analyze data, values, information, signals and/or communications stored by controller 102 during the performance of one or more combustion gas tests and/or by analysis module 194 during the analysis of such data. In some cases, reporting module 192 can be used to generate printable reports, visually displayable records and/or computer-readable data files that include data and/or information generated by diagnostic module 196. In a preferred arrangement, however, diagnostic module 196 will output or otherwise generate visually displayable records that include possible causes of deviations as well as recommended corrective actions to an associated visual communication device (e.g. device 172). In this manner, a user or operator can make one or more of the recommended corrective actions or other adjustments to the associated combustion appliance that is being tested, and can then re-test the combustion appliance to confirm that the associated combustion appliance is operating at or near desired performance levels. Non-limiting examples of recommended corrective actions can include cleaning specific components, adjusting one or more components or systems, such as the firing, air shutter, nozzle control, combustion zone and/or air, draft, barometric control and the like of the combustion system. The data and/or information generated by diagnostic module 196 can be stored in memory 185, such as is represented by box 196D in FIG. 5.

Controller 102, as is shown in FIG. 5, can also, optionally, include an prioritization module 198 that is capable of processing and storing data, values, information, signals and/or communications that may relate to possible causes of deviations and/or recommended corrective actions associated with the operation of the combustion appliance or system being tested. In some cases, prioritization module 198 apply one or more prioritization functions and/or logic algorithms to data, values, information, signals and/or communications generated and/or stored by controller 102 during the performance of a combustion gas test. In doing so, prioritization module 198 can generate a prioritized listing of possible causes and/or recommended corrective actions corresponding to the results of the combustion gas test. Additionally, prioritization module 198 can present the prioritized listing of possible causes and/or recommended corrective actions to a user or operator of system 100 and thereby provide the user or operator with possible causes and/or recommended corrective actions that are ranked from higher probability causes and corrective actions to lower probability causes and corrective actions.

In some cases, prioritization module 198 could retrieve prioritization functions, logic algorithms and/or prioritization values stored in memory 185, such as is represented by box 198D, for example. In some cases, such prioritization functions, logic algorithms and/or prioritization values could be stored within read-only memory within system 100 and remain unchanged during repeated usage. In such cases, changes to the prioritization functions, logic algorithms and/or prioritization values could be modified through software and/or firmware updates. In other cases, prioritization module 198 could employ one or more probability-based machine learning techniques to update and adjust one or more of the prioritization functions, logic algorithms and/or prioritization values. It will be appreciated that such one or more probability-based techniques could be utilized or implemented in any suitable manner. As one example, prioritization module 198 could analyze and determine possible causes of deviations and recommended corrective actions that are more effective or more-frequently effective at least partially resolve the performance deviations for a given operational state of the combustion appliance or system. Additionally, or in the alternative, prioritization module 198 could analyze and determine possible causes of deviations and recommended corrective actions that are less effective or less-frequently effective in resolving performance deviations for a given operational state of the combustion appliance or system. Prioritization module 198 can then update, adjust or otherwise change one or more of the prioritization functions, logic algorithms and/or prioritization values based at least in part on the effectiveness of the possible causes and recommended corrective actions to resolve the performance deviations for the given operational state of the combustion appliance or system. For a given operational state, more-effective causes and corrective actions will be promoted and prioritized at a higher level, and less-effective causes and corrective actions can be demoted and assigned a lower level priority, as system 100 is used to perform additional tests.

It will be appreciated that the one or more modules of controller 102, which are shown and described herein as modules 186-198, can be provided in any suitable manner, such as software, hardware and/or a combination of hardware and software, for example. In some cases, modules 186-198 can take the form of algorithms, routines and/or programs. If provided in whole or in part as software, the configuration and operation modules of controller 102 can be provided and stored in any suitable manner or arrangement. For example, all of the algorithms, routines and/or programs could be integrated into a single software program in which separate sections or portions of the software code will perform the various actions and/or activities of the system. In another embodiment, two or more independent modules (e.g., algorithms, routines and/or programs) could be used to perform the various actions and/or activities of the system.

Furthermore, memory 185 can store or otherwise retain any suitable data, values, settings, software, algorithms, routines, programs and/or any other information, in any suitable manner or form. And, in a preferred embodiment, microprocessor 184 can be in communication with memory 185 and can be operative to selectively access and/or process one or more of data, values, information, algorithms, routines and/or programs, such as those retained in memory stores 186-198 and/or 186D-198D, for example, alone or in combination. For example, microprocessor 184 can run or otherwise process an algorithm, routine or program, such as from one or more of memory locations 186-198 that is operative to access, analyze or otherwise utilize image data and/or information, such as may be stored in one or more of memory locations 186D-198D.

Figure 6:
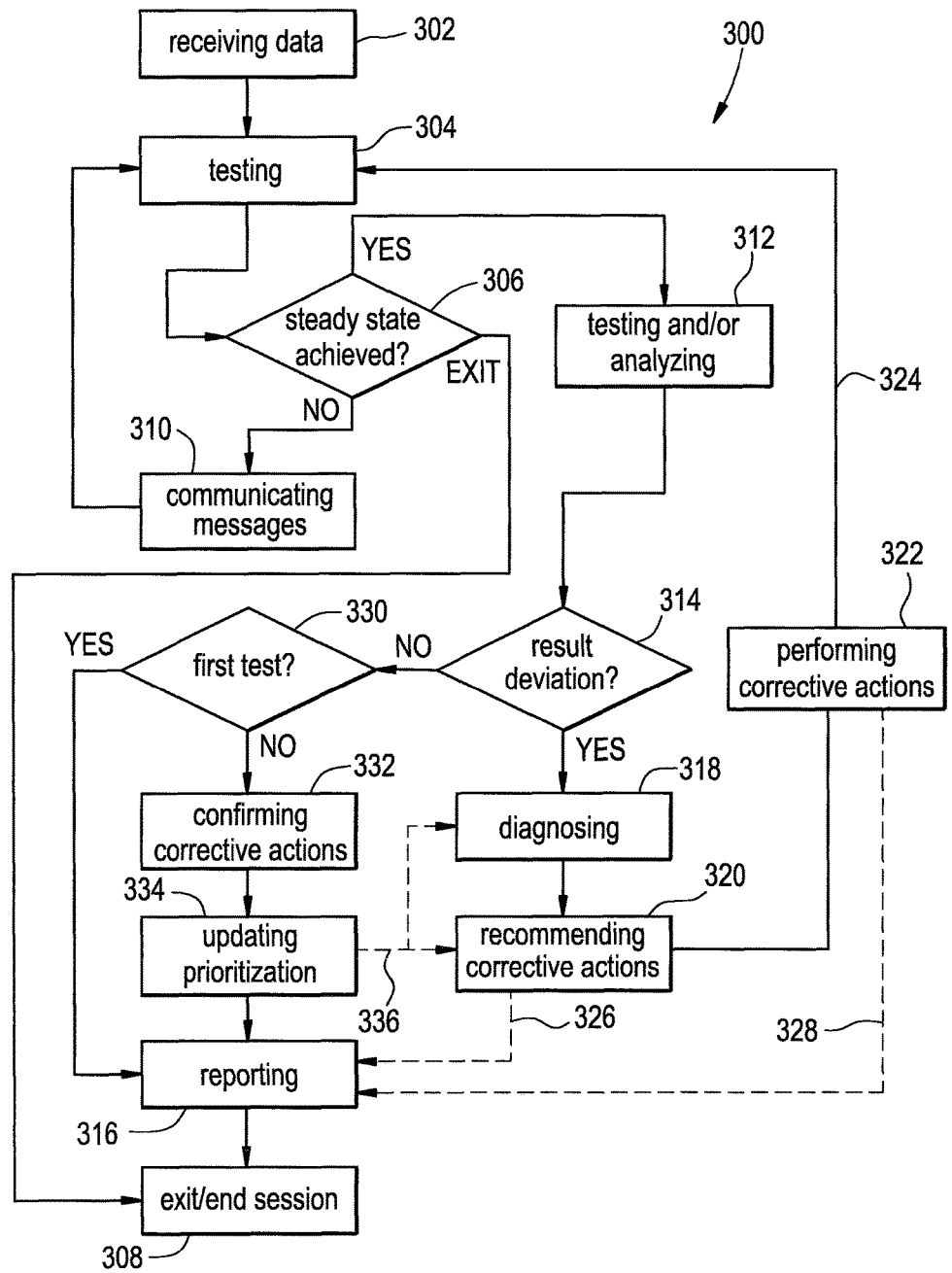
FIG. 6 is a graphical representation of one example of a method of analyzing combustion conditions and presenting combustion process diagnostics in accordance with the subject matter of the present disclosure.

FIG. 6 illustrates one example of a method 300 of analyzing combustion gases and presenting combustion process diagnostics in accordance with the subject matter of the present disclosure. Method 300 can include receiving combustion system data associated with the specifications and/or operating parameters of a combustion system, as is represented by box 302. Method 300 can also include testing and storing data relating to or otherwise associated with the combustion gases, as is represented by box 304. In some cases, testing and storing data in 304 can occur or otherwise be performed once the combustion system data has been received. Method 300 can also include determining a time rate of change (i.e., a derivative function with respect to time) for one or more operating parameters and/or combustion gas conditions to determine if steady state operation of the combustion system has been at least approximately achieved, as is represented by decision box 306. If it is determined that steady state operation has not been achieved, it may be desirable to exit the test current routine or otherwise end the testing session until steady state operation of the combustion appliance has been at least approximately achieved. In such case, an EXIT decision can be reached and method 300 can proceed to exit the test procedure or otherwise end the current test session, as is represented by box 308. Method 300 can then be re-initiated at an appropriate time.

In other cases, a NO decision is reached at decision box 306, and method 300 proceeds to communicate one or more messages to the user or operator, as is represented by box 310. In some cases, the one or more messages can include an indication that steady state operation of the combustion system has not been reached and that further testing at box 304 should be undertaken after an appropriate period of time. Upon determining that steady state operation of the combustion system being tested has been achieved, a YES decision is reached at box 306 and method 300 can proceed with analyzing the data to compare the measured and/or calculated properties and/or characteristics of combustion gases to predetermined, desired levels or ranges, such as may be derived from the specifications and/or operating parameters of the combustion system, as is represented by box 312. In some cases, analyzing the data in 312 can occur or otherwise be performed after the data relating to the testing of combustion gases is processed and stored.

Once the analysis in box 312 is complete, method 300 is shown as reaching a decision box 314 at a determination is made as to whether or not one or more operating conditions of the combustion system deviates from a desired range of operation. If a deviation is not detected, a NO decision is reached and method 300 can, optionally, proceed with reporting one or more of the measured and/or calculated properties and characteristics of combustion gases as well as one or more operating conditions of the combustion appliance or system, as is represented by box 316. Method 300 can then proceed to exit the test procedure or otherwise end the current test session, as is represented by box 308.

If a deviation is detected, a YES decision is reached at decision box 314 and method 300 can proceed with diagnosing the combustion system utilizing one or more logic algorithms to determine possible causes and recommended corrective actions, as is represented by box 318. Method 300 can also include displaying or otherwise communicating one or more possible causes and/or recommended corrective actions to a technician or user, as is represented by box 320. In a preferred arrangement, displaying the possible causes and/or recommended corrective actions will occur after the combustion gas data and combustion system data for the combustion system have been analyzed. In a preferred arrangement, a technician or user will perform one or more of the recommended corrective actions and/or other adjustments to the combustion appliance and/or system, as is represented by box 322. In such case, the combustion appliance and/or system may be re-tested and at least a portion of method 300 may be repeated, such as is represented by arrow 324. In some cases, results and/or actions presented to a user or operator and/or results and/or actions recorded by a user or operator could be reported using box 316, such as by way of arrows 326 and/or 328, for example.

Upon completion of one or more recommended corrective actions, the combustion appliance or system can be re-testing by repeating at least a portion of method 300. In such case, testing can be again completed at box 304 and a steady state determination can be made at box 306. Upon detecting a steady state condition, a YES determination is reached at box 306 and further testing and/or analysis can be performed at box 312. Once the analysis in box 312 is complete, method 300 reaches decision box 314 and a determination is made as to whether or not one or more operating conditions of the combustion system deviates from a desired range of operation. If a deviation is not detected, a NO decision is reached and method 300 can, optionally, proceed to report results at box 316, as previously discussed.

In some cases, method 300 can include between decision box 314 and reporting box 316 a determination as to whether the latest test is the first test in the current session, as is represented by decision box 330. Upon performing an initial test and reaching a NO determination at decision box 314, a YES decision is reached at decision box 330 and method 300 proceeds to reporting box 316, such as has been discussed above. Performance of method 300 in such a manner may be associated with the testing of a combustion appliance or system that is functioning within the desired parameters and/or conditions.

If, however, at least a portion of method 300 has been performed during the current session or test, a NO determination is reached at decision box 330 and method 300 proceeds to request confirmation from a user or operator that one or more possible causes has been addressed and/or one or more recommended corrective actions has been performed, as is represented by box 332. Performance of method 300 in such a manner may be associated with the testing of a combustion appliance or system that was functioning outside the desired parameters and/or conditions, but due to the performance of corrective actions by the user or operator is now functioning within the desired parameters and/or conditions. Upon confirmation that one or more of the possible causes has been addressed and/or performance of one or more recommended corrective actions has been completed and that such actions have improved the functioning of the combustion appliance or system, method 300 can, optionally, proceed to update the prioritization functions, logic algorithms and/or prioritization values, as is represented by box 334 and such as has been discussed above in detail in connection with prioritization module 198 in FIG. 5, for example. Updated prioritization functions, logic algorithms and/or prioritization values can be communicated to one or more of boxes 318 and 320 for use in diagnosing and/or recommending corrective actions in connection with future testing, as is represented by arrows 336 in FIG. 6.

Figure 7A:
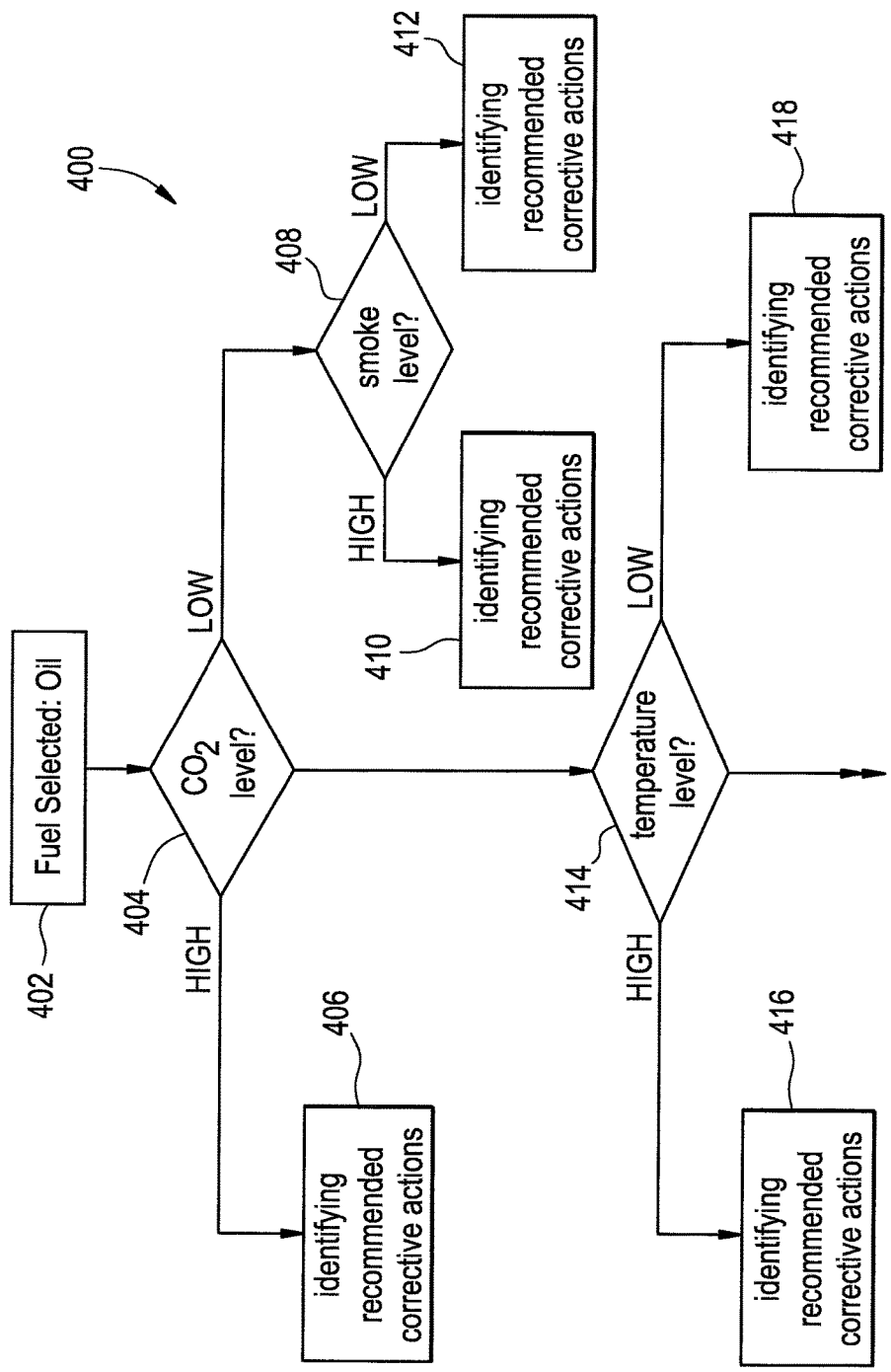
FIGS. 7A and 7B are graphical representations of one example of a logic algorithm for analyzing combustion conditions and presenting combustion process diagnostics in accordance with the subject matter of the present disclosure.
Figure 7B:
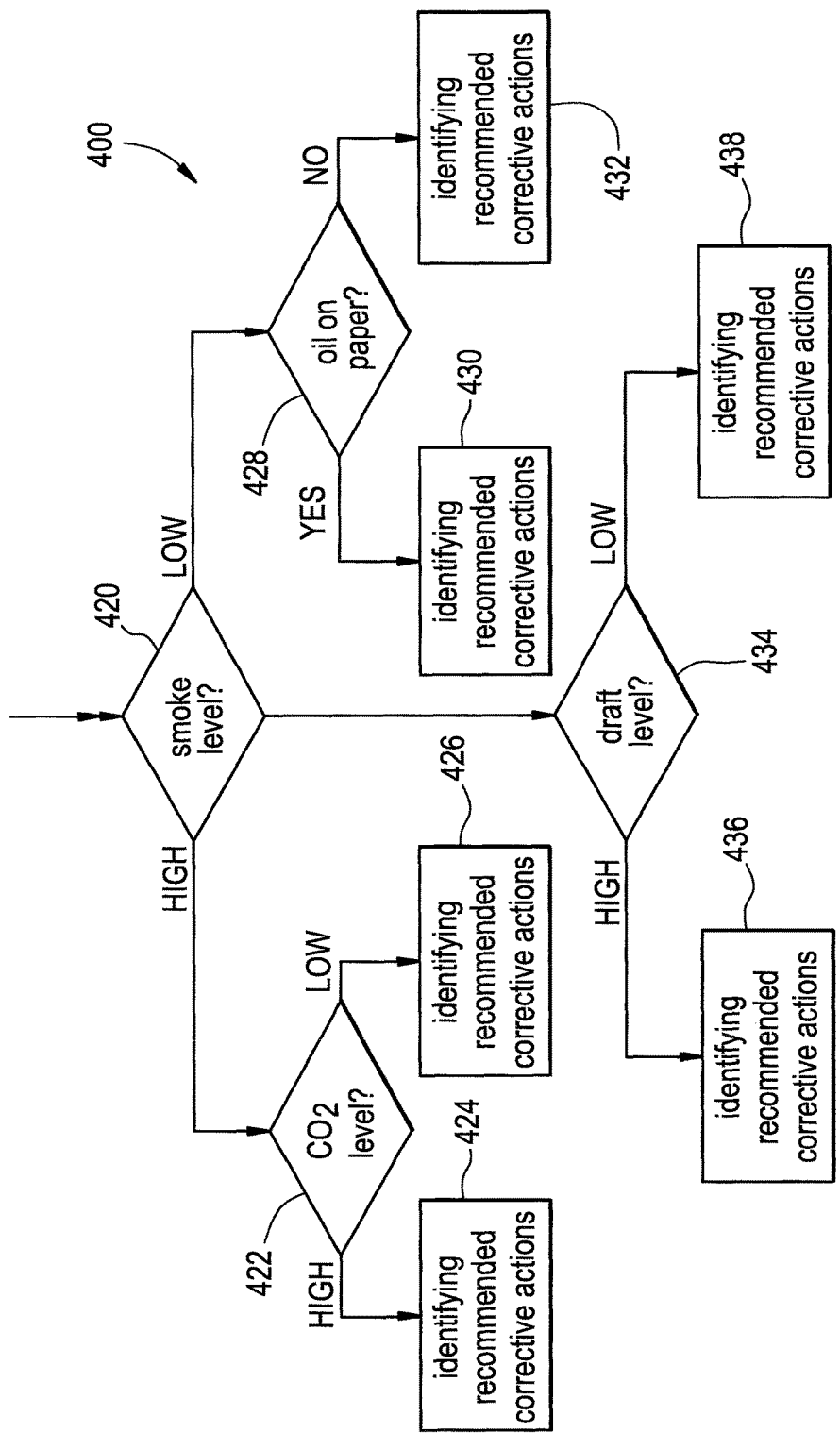

One example of a logic algorithm 400 for analyzing combustion gases and presenting combustion process diagnostics is shown in FIGS. 7A and 7B. Logic algorithm 400 is shown as including the selection of an appropriate fuel type of the combustion appliance or system. In FIG. 7A, the selected fuel type is identified as being fuel oil, as indicated by box 402. Logic algorithm 400 then reaches a decision box 404 at which it is determined if the carbon dioxide ($CO_2$) level is HIGH or LOW. If a determination of a HIGH carbon dioxide ($CO_2$) level is made, logic algorithm 400 identifies possible causes and/or recommended corrective actions, as is represented by box 406. In some cases, the possible causes and/or recommended corrective actions of box 406 can include the combustion system being over-fired, having low combustion air, not having enough draft and/or having a dirty fan. Alternately, if a determination of a LOW carbon dioxide ($CO_2$) level is made, logic algorithm 400 proceeds to a decision box 408 at which a determination is made of whether the smoke level is HIGH or LOW. If a determination of a HIGH smoke level is made, logic algorithm 400 identifies possible causes and/or recommended corrective actions, as is represented by box 410. In some cases, the possible causes and/or recommended corrective actions can include the combustion system being over-fired, the nozzle being too small, air leaks and/or the air shutter being too far open. If a determination of a LOW smoke level is made, logic algorithm 400 identifies possible causes and recommended correction actions, as is recommended by box 412. In some cases, the possible causes and/or recommended corrective actions can include the combustion system having a faulty nozzle and/or a poor combustion zone.

Under conditions in which the carbon dioxide ($CO_2$) level is within an acceptable range, logic algorithm 400 reaches a decision box 414 at which it is determined if the temperature level is HIGH or LOW. If a determination of a HIGH temperature level is made, logic algorithm 400 identifies possible causes and/or recommended corrective actions, as is represented by box 416. In some cases, the possible causes and/or recommended corrective actions can include the combustion system being over-fired, a dirty heat exchanger, the draft being too high, and/or a poor combustion zone. If a determination of a LOW temperature level is made, logic algorithm 400 identifies possible causes and/or recommended corrective actions, as is represented by box 418. In some cases, the possible causes and/or recommended corrective actions can include the combustion system being under-fired and/or not enough draft.

With reference, now, to FIG. 7B, under conditions in which the temperature level is within an acceptable range, logic algorithm 400 reaches a decision box 420 at which it is determined if the smoke level is HIGH or LOW. If a determination of a HIGH smoke level is made, logic algorithm 400 reaches a decision box 422 at which a determination of whether the carbon dioxide ($CO_2$) level is HIGH or LOW. If a determination of a HIGH carbon dioxide ($CO_2$) level determination is made, logic algorithm 400 identifies possible causes and/or recommended corrective actions, as is represented by box 424. In some cases, the possible causes and/or recommended corrective actions can include the combustion system being over-fired, excess air is too low and/or having a dirty fan. If a determination of a LOW carbon dioxide ($CO_2$) level is made, logic algorithm 400 identifies possible causes and/or recommended corrective actions, as is represented by box 426. In some cases, the possible causes and/or recommended corrective actions can include the combustion system having a poor nozzle function, faulty nozzle and/or a poor combustion zone. Returning to decision box 420, if a determination of a HIGH smoke level is made, logic algorithm 400 reaches decision box 428 at which it is determined whether or not oil is appearing on paper during a conventional smoke test. If a YES determination is made with respect to oil being on the paper, logic algorithm 400 identifies possible causes and/or recommended corrective actions, as is represented by box 430. In some cases, the possible causes and/or recommended corrective actions can include the combustion system having too high excess air and/or a poor nozzle function. If a NO determination is made with respect to oil being on the paper, logic algorithm 400 identifies possible causes and/or recommended corrective actions, as is represented by box 432. In some cases, the possible causes and/or recommended corrective actions can include the combustion system having air leaks into the system, air shutter being too far open, and/or the draft being too high.

If the smoke level is within an acceptable range, logic algorithm 400 reaches a decision box 434 at which it is determined if the draft level is HIGH or LOW. If a determination of a HIGH draft level is made, logic algorithm 400 identifies possible causes and/or recommended corrective actions, as is represented by box 436. In some cases, the possible causes and/or recommended corrective actions can include the combustion system being over-fired, excess air is too low and/or having a dirty fan. If a determination of a LOW draft level is made, logic algorithm 400 identifies possible causes and/or recommended corrective actions, as is represented by box 438. In some cases, the possible causes and/or recommended corrective actions can include the combustion system having a poor nozzle function, faulty nozzle and/or a poor combustion zone.

Figure 8A:
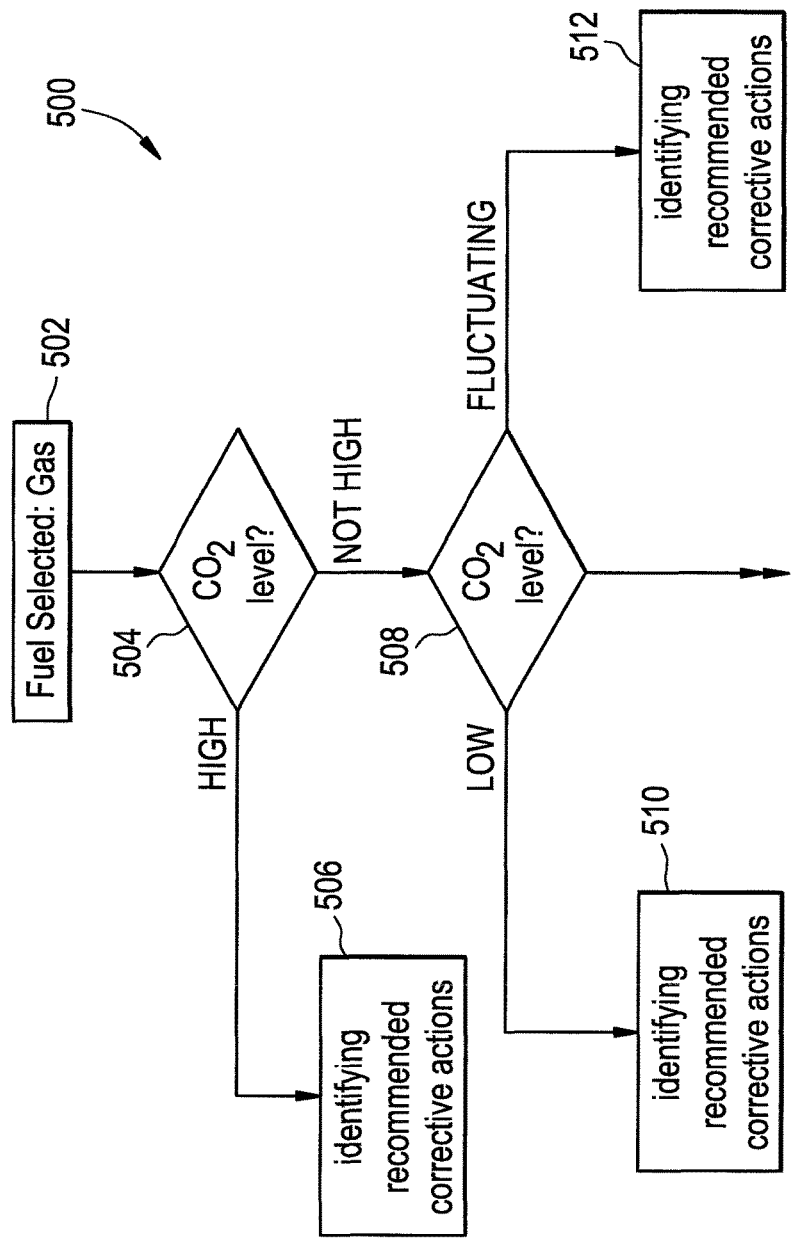
FIGS. 8A and 8B are graphical representations of another example of a logic algorithm for analyzing combustion conditions and presenting combustion process diagnostics in accordance with the subject matter of the present disclosure.
Figure 8B:
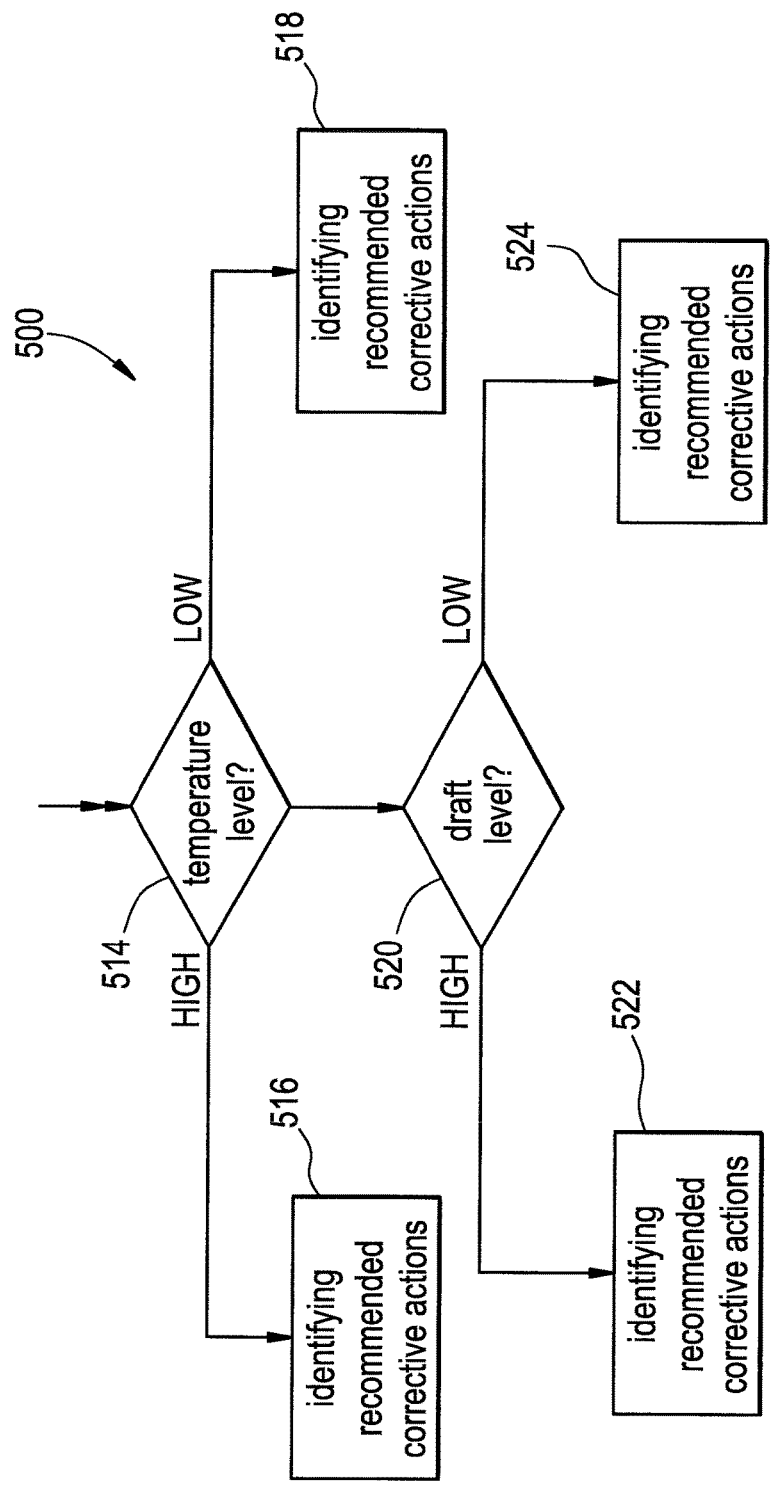

Another example of a logic algorithm 500 for analyzing combustion gases and presenting combustion process diagnostics is shown in FIGS. 8A and 8B. Logic algorithm 500 is shown as including the selection of an appropriate fuel type of the combustion appliance or system. In FIG. 8A, the selected fuel type is identified as being gas, as indicated by box 502. Logic algorithm 500 then reaches a decision box 504 at which it is determined if the carbon dioxide ($CO_2$) level is HIGH or NOT HIGH. If a determination of a HIGH carbon dioxide ($CO_2$) level is made, logic algorithm 500 identifies possible causes and/or recommended corrective actions, as is represented by box 506. In some cases, the possible causes and/or recommended corrective actions can include the combustion system being over-fired, low combustion air, and/or not enough draft. If a determination of a NOT HIGH carbon dioxide ($CO_2$) level is made, logic algorithm 500 reaches a decision box 508 at which a determination is made as to whether the carbon dioxide ($CO_2$) level is LOW or FLUCTUATING. If a determination of a LOW carbon dioxide ($CO_2$) level is made, logic algorithm 500 identifies recommended possible causes and/or corrective actions, as is represented by box 510. In some cases, the possible causes and/or recommended corrective actions can include the combustion system being under fired, too much air, and/or air leaks. If a determination of a FLUCTUATING carbon dioxide ($CO_2$) level is made, logic algorithm 500 identifies possible causes and/or recommended corrective actions, as is represented by box 512. In some cases, the possible causes and/or recommended corrective actions can include changing the atmospheric conditions, a cracked heat exchanger, and/or loose parts.

If the carbon dioxide ($CO_2$) level is stable and within an acceptable range, logic algorithm 500 reaches a decision box 514 at which it is determined if the temperature level is HIGH or LOW, as shown in FIG. 8B. If a determination of a HIGH temperature level is made, logic algorithm 500 identifies possible causes and/or recommended corrective actions, as is represented by box 516. In some cases, the possible causes and/or recommended corrective actions can include the combustion system being over-fired, high draft, dirty filter, and/or dirty heat exchanger. If a determination of a LOW temperature level determination is made, logic algorithm 500 identifies possible causes and/or recommended corrective actions, as is represented by box 518. In some cases, the possible causes and/or recommended corrective actions can include the combustion system being under-fired and/or not enough draft. If the temperature level is within an acceptable range, logic algorithm 500 reaches a decision box 520 at which it is determined if the draft level is HIGH or LOW. If a determination of a HIGH draft level is made, logic algorithm 500 identifies possible causes and/or recommended corrective actions, as is represented by box 522. In some cases, the possible causes and/or recommended corrective actions can include the combustion system having a poor vent size, no barometric control, and/or poor barometric control. If a determination of a LOW temperature level is made, logic algorithm 500 identifies possible causes and/or recommended corrective actions, as is represented by box 524. In some cases, the possible causes and/or recommended corrective actions can include the combustion system having poor vent size, poor chimney size, blocked vent, excess elbows, long horizontal runs, leak in chimney, leak in vent, low combustion air and/or poor barometric control.

Figure 9:
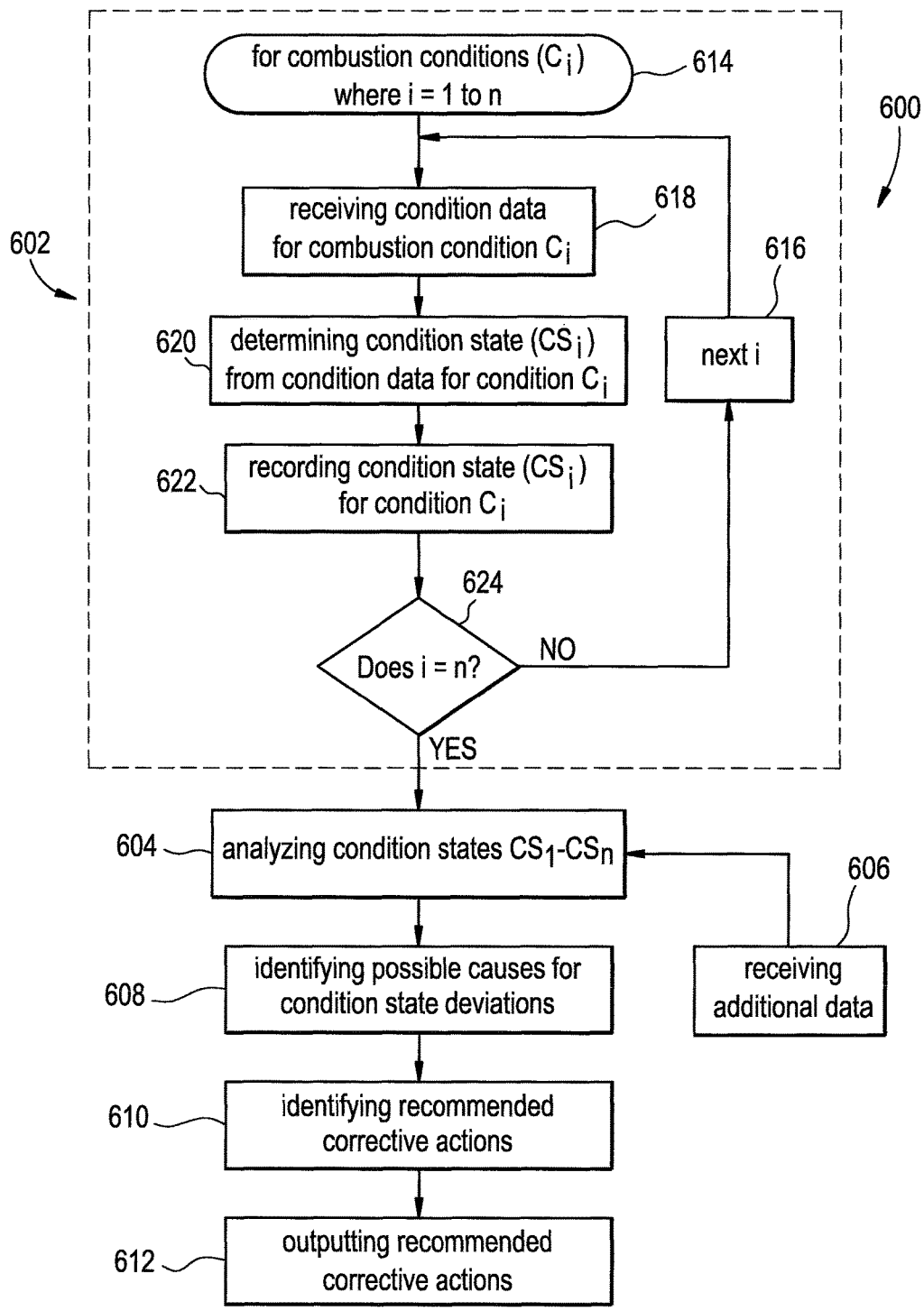
FIG. 9 is a graphical representation of still another example of a logic algorithm for analyzing combustion conditions and presenting combustion process diagnostics in accordance with the subject matter of the present disclosure.

A further example of a logic algorithm for analyzing combustion gases and presenting combustion process diagnostics is represented in FIG. 9 by item number 600. The logic algorithm can include determining a state of one or more combustion conditions associated with a combustion system or appliance being tested, such as is represented in FIG. 9 by box 602, for example. Additionally, logic algorithm 600 can further include analyzing a collection or group of the determined condition states, such as is represented by box 604. In some cases, logic algorithm can include receiving additional data, signals and/or information, such as is represented by box 606, and the action of analyzing in box 604 can include analyzing some or all of such additional data, signals and/or information.

In some cases, logic algorithm 600 can, optionally, include identifying one or more possible causes (e.g., environmental, operational and/or performance-related factors associated with the combustion system being tested) of any deviations or differences in the determined condition states, such as is represented in FIG. 9 by box 608. In some cases, any such deviations or differences could be identified by comparison of the determined condition states with condition states that would be associated with a combustion system or appliance having proper or otherwise desired combustion performance and/or characteristics. Additionally, or in the alternative, logic algorithm 600 can include identifying one or more recommended corrective actions that could be performed in connection with a combustion system or appliance being tested, such as is represented by box 610.

It will be appreciated that in some cases, logic algorithm 600 can proceed directly to identifying one or more recommended corrective actions without identifying possible causes for the deviations and/or differences in determined condition states in box 608, which is optional. In other cases, actions 608 and 610 can be combined such that one or more possible causes and/or one or more recommended corrective actions are identified by the logic algorithm. In any of such cases, logic algorithm 600 can further include outputting or otherwise communicating one or more possible causes and/or one or more recommended corrective actions to a technician or user, as is represented by box 612. In a preferred arrangement, a technician or user will perform one or more of the recommended corrective actions and/or other adjustments to the combustion appliance and/or system. In such cases, the combustion appliance and/or system may be re-tested and at least a portion of logic algorithm 600 may be repeated.

As indicated above, it will be appreciated that determining a state of one or more combustion conditions in box 602 can be achieved in any suitable manner. As one example, logic algorithm 600 is shown as including an algorithm or routine in which a combustion state ($CS_i$) is determined and recorded for plurality of combustion conditions ($C_i$) based at least in part on data, signals and/or information that can be input, measured or otherwise acquired by a controller of an associated analyzer and diagnostic system (e.g., controller 102 of system 100). In the arrangement represented in FIG. 9, box 602 includes a routine that is performed for a plurality of iterations (i). In some cases, the routine can take the form of a FOR-NEXT loop, which is respectively represented in FIG. 9 by boxes 614 and 616, where iterations (i) include 1 to n with "n" having a predetermined value, such as a predetermined value within a range of from (2) to fifty (50), for example.

During each iteration of the routine in box 602, a combustion condition ($C_i$) is identified for which condition data is received, measured or otherwise acquired, as is represented in FIG. 9 by box 618. Additionally, box 602 can include determining a condition state ($CS_i$) for combustion condition ($C_i$) based at least in part on the condition data received in box 620. It will be appreciated that the condition states that may be determined can vary from application to application, and that condition states of any suitable type, kind and/or quantity (e.g., from 2 to 50 condition states) could be used. As non-limiting examples, condition states ($CS_i$) such as "In Range," "High," "Low," "Fluxuating," "Rising," and/or "Falling" could be used, in some cases. Once a condition state ($CS_i$) for each combustion condition ($C_i$) has been determined, the condition state ($CS_i$) can be recorded in a suitable manner, such as by storage in memory 185, for example, as is represented in FIG. 9 by box 622. A determination can then be made as to whether or not the $n^{th}$ iteration has been completed, at box 624.

Figure 10:
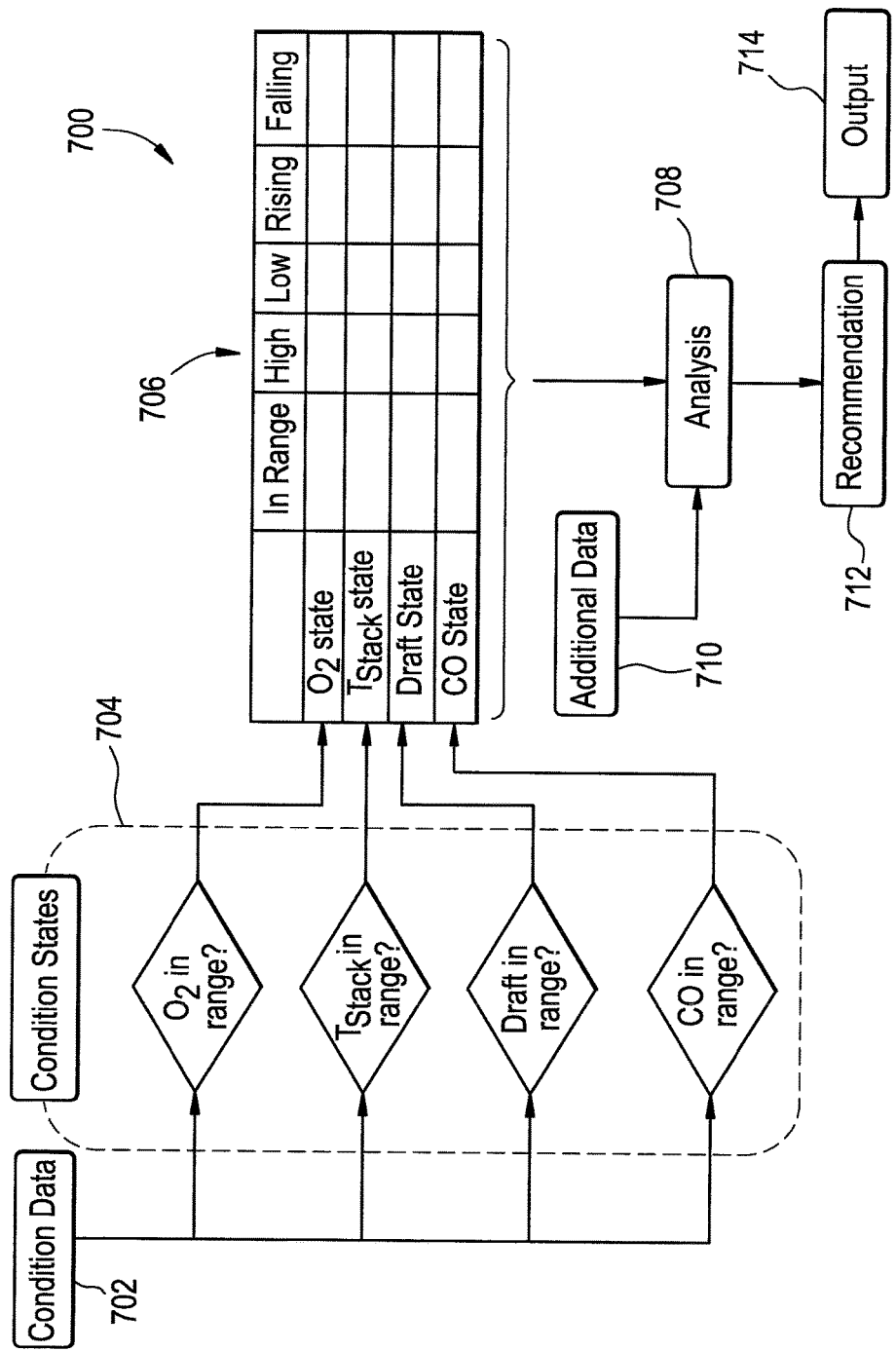
FIG. 10 is a graphical representation of one example of an information and data flow associated with the logic algorithm shown in FIG. 9.

One example of an information and data flow in accordance with the subject matter of the present disclosure that could, in some cases, be associated with a logic algorithm, such as logic algorithm 600 in FIG. 9, for example, is represented in FIG. 10 by reference number 700. In the present example, condition data in the form of data, signals and/or information corresponding to one or more combustion conditions ($C_i$) can be communicated, received and/or otherwise provided in a suitable manner, as is represented by box 702. In some cases, such condition data could be associated with action 618 of logic algorithm 600 in FIG. 9. Additionally, in some cases, such condition data could be operatively associated with testing and operation module 190 and 190D of memory 185.

It will be appreciated that an information and data flow in accordance with the subject matter of the present disclosure can, preferably, involve a plurality of combustion conditions (e.g., oxygen concentration level, stack temperature level, stack draft/pressure level, carbon monoxide concentration level). In the present example, data, signals and/or information corresponding to given combustion states ($CS_i$) can be determined, as is represented by box 704 in FIG. 10. In some cases, a determination of such combustion states could be associated with action 620 of logic algorithm 600. Additionally, in some cases, such data, signals and/or information corresponding to combustion states ($CS_i$) can be operatively associated with testing and operation module 190 and 190D and/or with analysis module 194 and 194D of memory 185.

Data, signals and/or information corresponding to the given combustion states as represented in box 704 can be communicated, stored, recorded or otherwise retained in a table, database, memory or other device. In some cases, such data, signals and/or information could be associated with action 622 of logic algorithm 600. In a preferred arrangement, a state table (which may also be referred to as a matrix or lookup table), which is represented in FIG. 10 by reference number 706, can be generated that includes data and/or information corresponding to condition states ($CS_i$) for a plurality of combustion conditions ($C_i$). In some cases, such data and/or information corresponding to state table 706 can be operatively associated with testing and operation module 190 and 190D, with analysis module 194 and 194D and/or with diagnostic module 196 and 196D of memory 185.

Data, signals and/or information contained in or otherwise corresponding to a given state table 706 can be communicated or otherwise accessed for analysis such that a determination can be made as to one or more possible causes and/or one or more recommended corrective actions corresponding to the combination of condition states ($CS_i$) recorded in the given state table. Data and/or information corresponding to such determinations is represented in FIG. 10 by box 708. It will be appreciated that such data and/or information can include interim and final data and/or information, such as may be used or generated during an analysis. In some cases, such data and/or information could be associated with action 604 of logic algorithm 600.

In some cases, additional data, signals and/or information can be communicated, received and/or otherwise provided, as is represented in FIG. 10 by box 710. As one example, data, signals and/or information relating to fuel type could be communicated, received or otherwise provided. As another example, data and/or information corresponding to pre-established state tables having a relation to corresponding possible causes and/or corresponding recommended corrective actions could be communicated, received or otherwise provided. In such cases, an action of analyzing could include comparing state table 706 with one or more pre-established state tables. In some cases, analysis data and/or information 708 can be operatively associated with analysis module 194 and 194D and/or with diagnostic module 196 and 196D of memory 185.

Data, signals and/or information relating to possible causes and/or recommended corrective actions is represented by box 712 in FIG. 10. In some cases, such data, signals and/or information could be associated with actions 608 and/or 610 of logic algorithm 600. Additionally, in some cases, such data, signals and/or information can be operatively associated with analysis module 194 and 194D and/or with diagnostic module 196 and 196D of memory 185.

Data, signals and/or information relating to outputting or otherwise communicating possible causes and/or recommended corrective actions is represented by box 714 in FIG. 10. In some cases, such data, signals and/or information could be associated with action 612 of logic algorithm 600. Additionally, in some cases, such data, signals and/or information can be operatively associated with reporting module 192 and 192D and/or with diagnostic module 196 and 196D of memory 185.

Figure 11A:
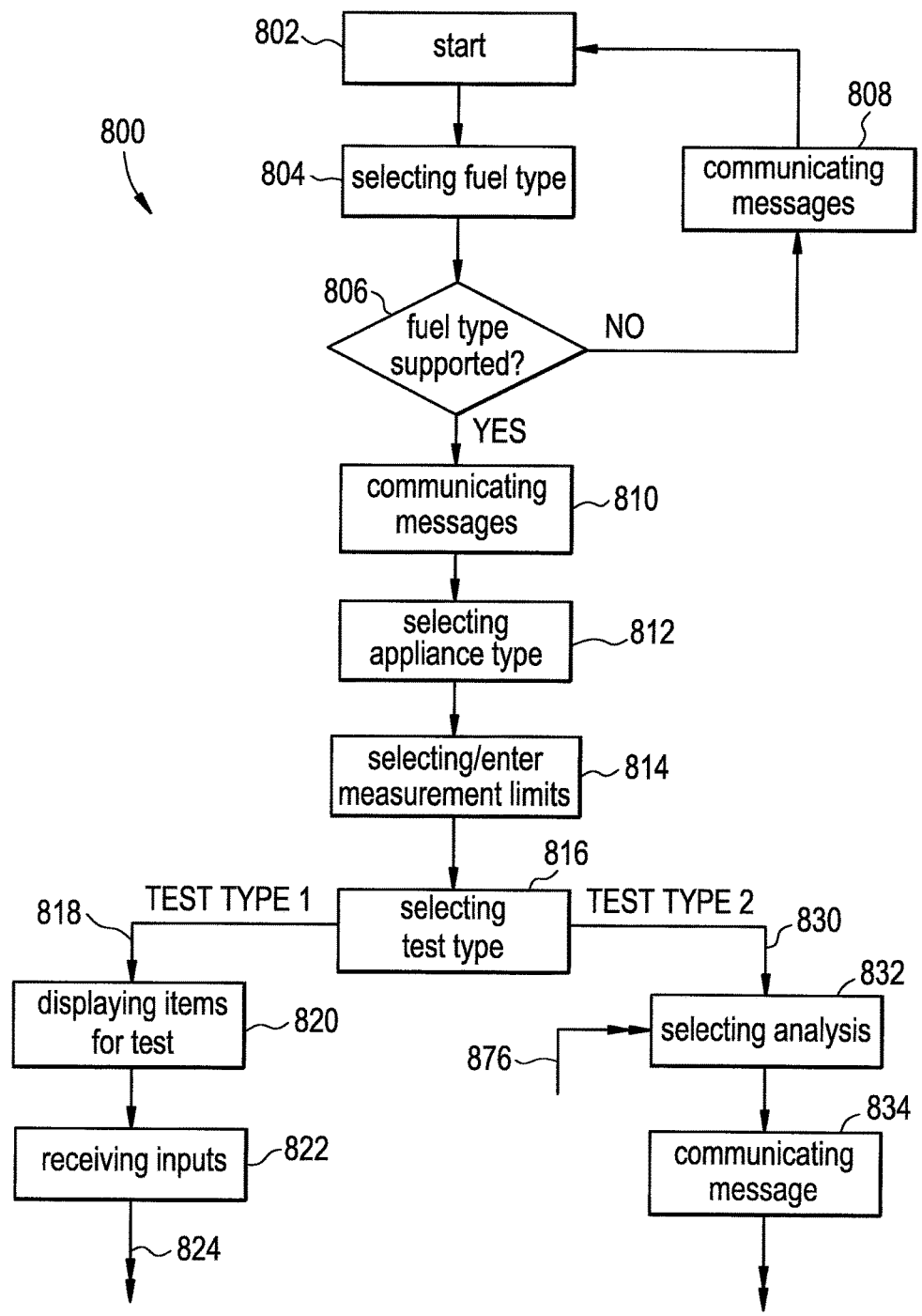
FIGS. 11A, 11B and 11C are graphical representations of a further example of a logic algorithm for analyzing combustion conditions and presenting combustion process diagnostics in accordance with the subject matter of the present disclosure.
Figure 11B:
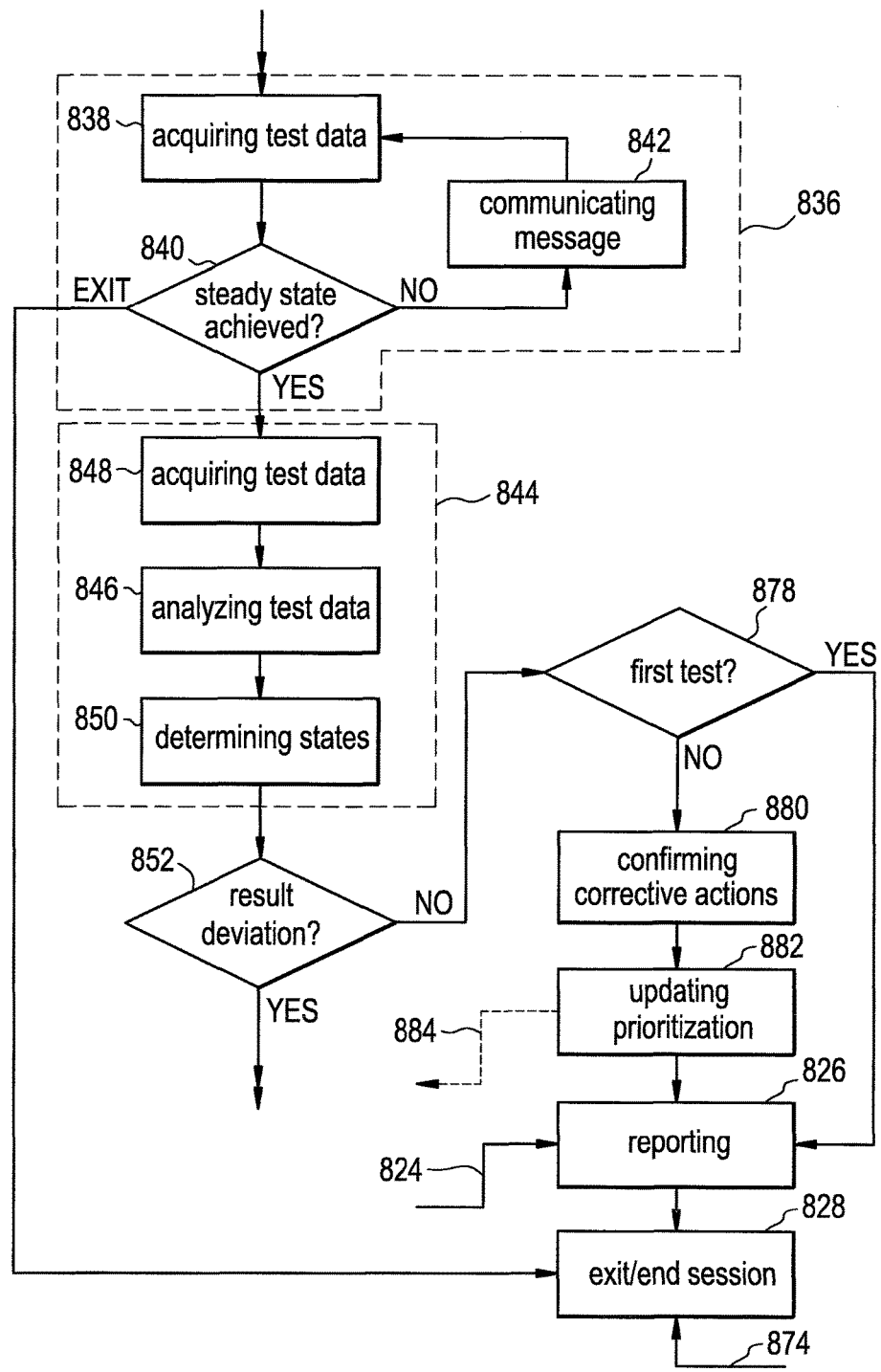
Figure 11C:
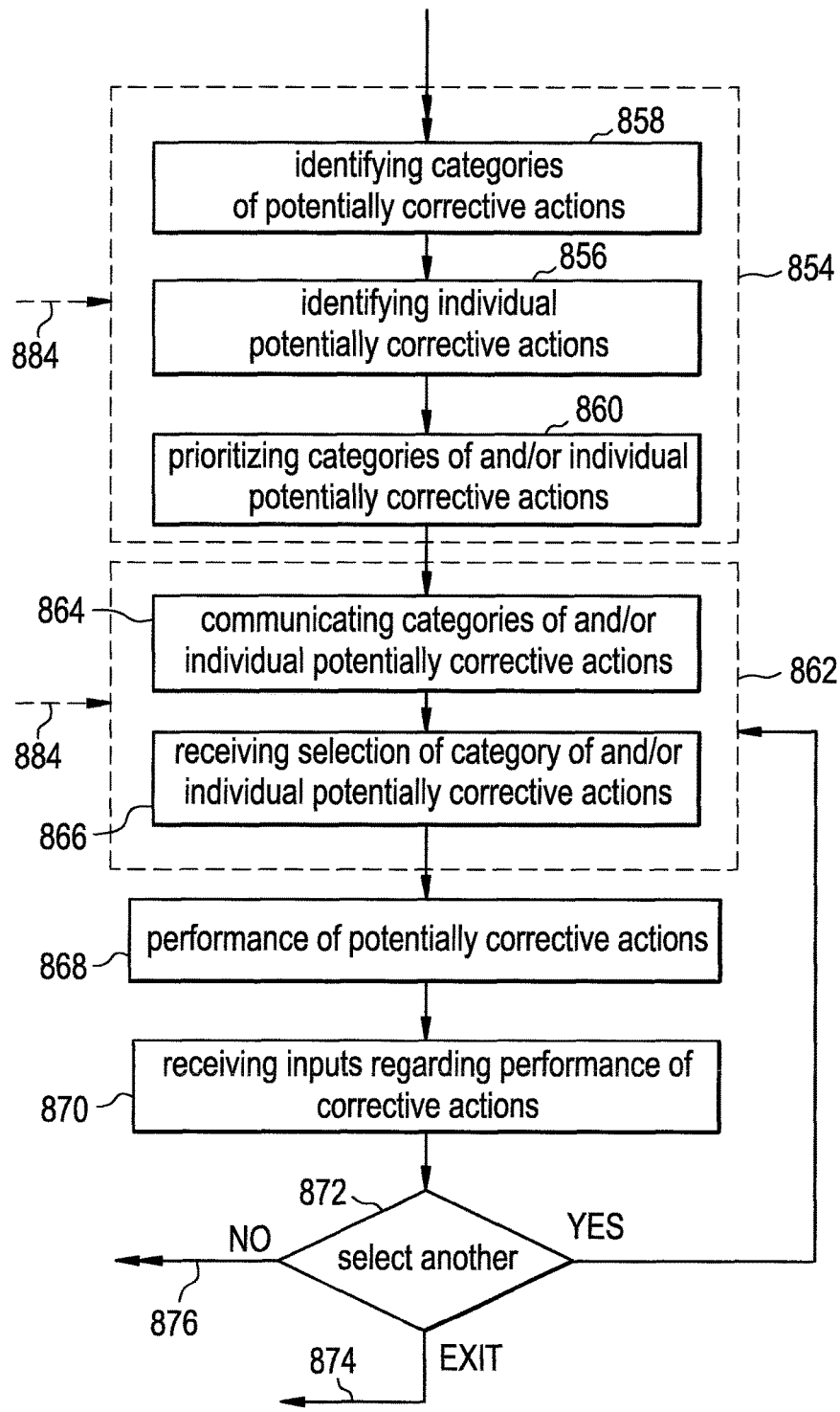

FIGS. 11A, 11B and 11C illustrate a further example of a method 800 of analyzing combustion gases and presenting combustion process diagnostics in accordance with the subject matter of the present disclosure. As shown in FIG. 11A, method 800 can be initiated at box 802 and can include selecting a fuel type or receiving a fuel type selection input by a user or operator corresponding to the fuel type of the combustion appliance or system being tested, as is represented by box 804. Method 800 also includes confirming that the selected fuel type is supported by the analysis and diagnostic process, as is represented by decision box 806. If the selected fuel type is not supported, a NO determination is reached at box 806 and method 800 proceeds to communicate one or more messages to the user or operator, as is represented by box 808.

If the selected fuel type is supported, a YES determination is reached at box 806 and method 800 proceeds to communicate one or more messages to the user or operator, as is represented by box 810. Method 800 can also include selecting a combustion appliance or system type or receiving a combustion appliance or system type selection input by a user or operator corresponding to the type of combustion appliance or system being tested, as is represented by box 812. Method 800 can, optionally, include selecting one or more measurement limits corresponding to the selected type of combustion appliance or system and/or receiving one or more measurement limits input by a user or operator, as is represented by box 814 in FIG. 11A.

Method 800 can also include selecting a test type from one or more available test types (e.g., an inspection test, a troubleshooting test) or receiving a test type selection input by a user or operator, as is represented by box 816. If a TEST TYPE 1 is selected, method 800 proceeds along arrow 818 and can display or otherwise communicate to a user or operator one or more items associated with the performance and/or completion of TEST TYPE 1, as is represented by box 820. Method 800 can also, optionally, include receiving one or more inputs from a user or operator regarding the performance and/or completion of TEST TYPE 1, as is represented by box 822. In some cases, method 800 can proceed along arrow 824 to reporting one or more details associated with the performance and/or completion of TEST TYPE 1, as is represented by box 826. Method 800 can then proceed to exit the test procedure or otherwise end the current test session, as is represented by box 828.

If a TEST TYPE 2 is selected at box 816, method 800 proceeds along arrow 830 and can include selecting an analysis to be performed in connection with the combustion appliance or system or receiving an analysis selection input by a user or operator, as is represented by box 832. Method 800 can further proceed to communicate one or more messages to the user or operator, as is represented by box 834. In some cases, the one or more message can include instructions and/or recommendations regarding the order of performance of the analysis types.

As illustrated in FIG. 11B, method 800 can also include confirming that the combustion appliance or system is performing at at least an approximately steady state operation, as is represented by box 836. It will be appreciated that such an action can be performed in any suitable manner. As one non-limiting example, method 800 can include acquiring combustion condition data associated with the combustion appliance or system being tested, such as is represented by box 838. Additionally, method 800 can include determining a time rate of change (i.e., a derivative function with respect to time) for one or more operating parameters and/or combustion gas conditions to determine if steady state operation of the combustion system has been at least approximately achieved, as is represented by decision box 840. If it is determined that steady state operation has not been achieved, it may be desirable to exit the test current routine or otherwise end the testing session until steady state operation of the combustion appliance has been at least approximately achieved. In such case, an EXIT decision can be reached and method 800 can proceed to exit the test procedure or otherwise end the current test session, as is represented by box 828. Method 800 can then be re-initiated at an appropriate time.

In other cases, a NO decision is reached at decision box 840, and method 800 proceeds to communicate one or more messages to the user or operator, as is represented by box 842. In some cases, the one or more messages can include an indication that steady state operation of the combustion system has not been reached and that further testing at box 838 should be undertaken after an appropriate period of time. Upon determining that steady state operation of the combustion system being tested has been achieved, a YES decision is reached at box 840 and method 800 can proceed with analyzing the data, as is represented by box 844. It will be appreciated that such an analysis can be performed in any suitable manner. As one non-limiting example, method 800 can include analyzing the test data by comparing measured and/or calculated properties and/or characteristics of combustion gases to predetermined, desired levels or ranges, such as may be derived from the specifications and/or operating parameters of the combustion system, as is represented by box 846. In some cases, method 800 can, optionally, include acquiring additional test data prior to making such a comparison, as is represented by box 848.

Additionally, in a preferred arrangement, method 800 can include identifying or otherwise determining one of two or more discrete states or conditions of one or more parameters, properties and/or characteristics of the combustion gases, as is represented by box 850. As one non-limiting example, a data structure is shown in FIGS. 12A and 12B that includes Parameters 1 and 2, which can include any one of three discrete states (e.g., O, H, L), and Parameter 3, which can include either one of two discrete states (e.g., O, H). In the exemplary arrangement in FIGS. 12A and 12B, the character "O" can be represented of an acceptable or OK state (i.e., measurements within an acceptable range of values), the character "H" can be representative of a High state (i.e., measurements exceeding the upper limit of an acceptable value or range of values), and the character "L" can be representative of a Low state (i.e., measurements below the lower limit of an acceptable value or range of values).

With further reference to FIGS. 12A and 12B, it will be recognized that a predetermined number of combinations of states (e.g., O, H and L) for the given parameters (e.g., Parameters 1-3) can be identified. In FIGS. 12A and 12B, the combinations of states are identified as States 1-18. It will be appreciated, however, that any suitable number of state combinations can be used, such as may corresponding to the number of parameters and number of discrete states measured for each parameter, for example.

Method 800 is shown in FIG. 11B as reaching a decision box 852 at which a determination is made as to whether or not one or more operating conditions of the combustion system deviates from a desired range of operation. If a deviation is not detected, a NO decision is reached and method 800 can, optionally, proceed with reporting one or more of the measured and/or calculated properties and characteristics of combustion gases as well as one or more operating conditions of the combustion appliance or system, as is represented by box 826. Method 800 can then proceed to exit the test procedure or otherwise end the current test session, as is represented by box 828.

If a deviation is detected, a YES decision is reached at decision box 852 and method 800 can proceed with diagnosing the combustion system utilizing one or more logic algorithms to determine possible causes and recommended corrective actions, as is represented by box 854. It will be appreciated that such an action can be performed in any suitable manner. As shown in FIGS. 12A and 12B, a plurality of Actions A1-3, B1-4, C1-4, D1-3, E1-5, F1 and F2, G1-5, H1-6 and J1-4 are represented as being associated in different combinations with one or more of States 1-18. As one non-limiting example, method 800 can include identifying one or more potentially or otherwise recommended corrective actions, such as may be associated with a particular combination of states (e.g., a combination of states O, H and/or L for Parameters 1-3, or one of States 1-18), as is represented by box 856 in FIG. 11C. In some cases, the plurality of recommended corrective actions (e.g., Actions A1-3, B1-4, C1-4, D1-3, E1-5, F1 and F2, G1-5, H1-6 and J1-4) can be grouped into one or more categories, such as are identified in FIGS. 12A and 12B as Categories A-J, for example. In such case, method 800 can, optionally, include identifying one or more categories of recommended corrective actions, as is represented in FIG. 11C by box 858.

Method 800 can also, optionally, include prioritizing or otherwise arranging one or more categories of recommended corrective actions and/or a plurality of individual recommended corrective actions that are ranked from higher probability causes and corrective actions to lower probability causes and corrective actions, as is represented by box 860. FIGS. 12A and 12B are shown as including the Categories and Actions prioritized in various numerical orders from Priority 1 to Priority 3 (or more) depending upon the particular States and/or combination of states for Parameters 1-3.

Method 800 can also include recommending one or more possible causes and/or corrective actions to a technician or user, as is represented by box 862. It will be appreciated that such an action can be performed in any suitable manner. As one non-limiting example, method 800 can include displaying or otherwise communicating one or more categories and/or recommended corrective actions to a user or operator, as is represented by box 864. Method 800 can further include receiving a selection of one or more categories and/or recommended corrective actions to be performed by the user or operator, as is represented by box 866.

In a preferred arrangement, a technician or user will perform one or more of the recommended corrective actions and/or other adjustments to the combustion appliance and/or system, as is represented by box 868. Additionally, method 800 can include receiving inputs from the user or technician regarding the performance of the one or more recommended corrective actions from box 868, as is represented by box

870. As non-limiting examples, such inputs can include an indication of whether a given recommended corrective action was check and OK, not check, or checked and repaired. Method 800 can also include a determination as to whether or not additional potentially corrective actions and/or categories should be investigated, as is represented by decision box 872. In some cases, it may be desirable to perform additional recommended corrective actions, such as actions having a lower priority, for example, prior to re-testing the combustion appliance or system. In such cases, a YES determination is reached at decision box 872 and method 800 returns to box 862 for recommendation and selection of additional corrective actions. In other cases, it may be desirable to simply exit the current test or session. In such cases, an EXIT decision can be reached and method 800 can proceed to exit the test procedure or otherwise end the current test session, as is represented by arrow 874 and box 828.

In still other cases, a NO determination can be reached and method 800 can proceed along arrow 876 to box 832 at which a further (or next) analysis can be selected. In some cases, a different analysis may be performed. In other cases, a re-test of the combustion appliance or system can be performed, such as by proceeding through boxes 834, 836 and 844, as discussed above, for example. In such cases, method 800 can proceed to decision box 852 where determination is made as to whether or not one or more operating conditions of the combustion system deviates from a desired range of operation. If a deviation is not detected, a NO decision is reached and method 800 can, optionally, proceed to report results at box 826, as previously discussed.

Upon completion of one or more recommended corrective actions, the combustion appliance or system may be re-tested by repeating at least a portion of method 800. In such cases, method 800 can, optionally, include between decision box 852 and reporting box 826 a determination as to whether the latest test is the first test in the current session, as is represented by decision box 878. Upon performing an initial test and reaching a NO determination at decision box 852, a YES decision is reached at decision box 878 and method 800 proceeds to reporting box 826, such as has been discussed above. Performance of method 800 in such a manner may be associated with the testing of a combustion appliance or system that is functioning within the desired parameters and/or conditions. If, however, at least a portion of method 800 has been performed during the current session or test, a NO determination is reached at decision box 878 and method 800 can proceed to request confirmation from a user or operator that one or more possible causes has been addressed and/or one or more recommended corrective actions has been performed, as is represented by box 880.

Performance of method 800 in such a manner may be associated with the testing of a combustion appliance or system that was functioning outside the desired parameters and/or conditions, but due to the performance of corrective actions by the user or operator is now functioning within the desired parameters and/or conditions. Upon confirmation that one or more of the possible causes has been addressed and/or performance of one or more recommended corrective actions has been completed and that such actions have improved the functioning of the combustion appliance or system, method 800 can, optionally, proceed to update the prioritization functions, logic algorithms and/or prioritization values, as is represented by box 882 and such as has been discussed above in detail in connection with prioritization module 198 in FIG. 5, for example. Updated prioritization functions, logic algorithms and/or prioritization values can be communicated to one or more of boxes 854 and 862 for use in diagnosing and/or recommending corrective actions in connection with future testing, as is represented by arrows 884 in FIGS. 11B and 11C.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language.

Additionally, it will be recognized that numerous different features and/or components are presented in the embodiments shown and described herein, and that it may be that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A handheld combustion analyzer and diagnostic instrument comprising:
   a housing including a housing wall that at least partially defines a housing cavity;
   a plurality of connectors accessible from along said housing wall;
   a plurality of sensors operable to generate combustion condition data relating to an operating condition of an associated combustion system;
   a controller at least partially disposed within said housing cavity and including a processor and a memory communicatively coupled with said processor, said controller communicatively coupled with said plurality of connectors and said plurality of sensors, said memory operative to store data and one or more programs including a plurality of recommended corrective actions corresponding to one or more performance deviations of the associated combustion system and at least one of a prioritization routine and a plurality of prioritization values;

a visual communication device supported on said housing wall and communicatively coupled with said controller; and, an input communication device communicatively coupled with said controller;

said processor operable to access said data and said one or more programs from said memory such that said processor is programmed to:

receive combustion condition data having a relation to the associated combustion system generated by one of more of said plurality of sensors;

analyze said combustion condition data to determine an operating state of the associated combustion system;

diagnose said operating state of the associated combustion system utilizing one or more logic algorithms to identify one or more recommended corrective actions from said memory;

generate a ranked listing of said one or more of said identified recommended corrective actions;

communicate said ranked listing of said one or more of said identified recommended corrective actions to the associated user through said visual communication device;

receive input data from the associated user regarding performance of said one or more of said identified recommended corrective actions; and, alter at least one of said prioritization routine and said plurality of prioritization values in said memory based at least in part on said input data received from the associated user regarding performance of said one or more of said identified recommended corrective actions.

2. A handheld combustion analyzer and diagnostic instrument according to claim 1, wherein said processor is programmed to identify time-rates-of-change of combustion condition data, determine if any of said time-rates-of-change exceed a corresponding predetermined threshold value, and communicate a message having a relation to said time-rates-of-change to the associated user through said visual communication device.

3. A handheld combustion analyzer and diagnostic instrument according to claim 1 further comprising a hose and probe assembly dimensioned for communicative coupling with at least one of said plurality of connectors.

4. A handheld combustion analyzer and diagnostic instrument according to claim 1, wherein said processor is programmed to receive combustion system data having a relation to the associated combustion system, and determine said operating state of the associated combustion system using a combination of said combustion condition data and said combustion system data.

5. An analyzer and diagnostic system comprising: one or more sensors operable to generate combustion condition data relating to the performance of an associated combustion system;

an analysis module operable to analyze at least a portion of said combustion condition data and determine a state of the associated combustion system;

a diagnostic module operable to identify one or more recommended corrective actions for a combustion system performance deviation from a plurality of recommended corrective actions using one or more logic algorithms;

a prioritization module communicatively coupled with at least said diagnostic module and operable to generate a ranked listing of said one or more recommended corrective actions for selective performance by an associated user, said prioritization module including at least one of a prioritization algorithm and a plurality of prioritization values used to generate said ranked listing of said one or more recommended corrective actions; and, at least one user communication channel communicatively coupled with at least one of said analysis module and said diagnostic module and operable to receive inputs generated by an associated user in connection with the performance of said one or more recommended corrective actions;

said prioritization module operable to adjust one or more of said at least one prioritization algorithm and said plurality of prioritization values based on said inputs generated by the associated user in connection with the performance of said one or more recommended corrective actions.

6. An analyzer and diagnostic system according to claim 5, wherein said testing and operation module is operable to receive combustion system data having a relation to the associated combustion system.

7. An analyzer and diagnostic system according to claim 6, wherein said analysis module is operable to determine said operating state of the associated combustion system using a combination of said combustion condition data and said combustion system data.

8. An analyzer and diagnostic system according to claim 5, wherein said testing and operation module is operable to identify one or more operating conditions of the associated combustion system having a time-rate-of-change greater than a predetermined threshold value.

9. An analyzer and diagnostic system according to claim 8 further comprising at least one user communication channel communicatively coupled with at least said testing and operation module and operable to communicate to the associated user that at least one of:

a time-rate-of-change of an operating condition exceeds a predetermined threshold condition and the associated combustion system is not operating at at least an approximately steady state condition; and, a time-rate-of-change of an operating condition meets a predetermined threshold condition and the associated combustion system is operating at at least an approximately steady state condition.

10. An analyzer and diagnostic system according to claim 5 further comprising at least one user communication channel communicatively coupled with at least said diagnostic module and operable to communicate said one or more recommended corrective actions to the associated user.

11. An analyzer and diagnostic system according to claim 5 further comprising a controller communicatively coupled with at least said one or more sensors, said controller including a memory storing data and software routines operable to function as at least said analysis and diagnostic modules and a processor communicatively coupled with said memory and operable to access said data and execute said software routines using said data.

12. A handheld instrument comprising:

a housing including a housing wall at least partially defining a housing cavity; and, an analyzer and diagnostic system according to claim 5 at least partially received within said housing cavity.

13. A kit comprising:

a handheld instrument according to claim 12, said housing including at least one connector accessible from along said housing wall and communicatively coupled with said analyzer and diagnostic system; and, a hose and probe assembly including at least one connector cooperative with said at least one connector of said handheld instrument.

14. A method of analyzing combustion conditions of a combustion system and presenting combustion process diagnostics, said method comprising:
   generating combustion condition data relating to the combustion system;
   analyzing said combustion condition data to determine an operating state of the combustion system;
   diagnosing said operating state of the combustion system by identifying one or more recommended corrective actions for a combustion system performance deviation from a plurality of recommended corrective actions using one or more logic algorithms;
   generating a ranked listing of said one or more of said identified recommended corrective actions;
   communicating said ranked listing of said one or more of said identified recommended corrective actions to a user;
   receiving user input data regarding performance of one or more of said identified recommended corrective actions; and,
   altering at least one of a prioritization routine and a prioritization value stored in a memory based at least in part on said user input data regarding performance of said one or more of said identified recommended corrective actions.

15. A method according to claim 14 further comprising receive combustion system data having a relation to the associated combustion system, and determine said operating state of the associated combustion system using a combination of said combustion condition data and said combustion system data.

16. A method according to claim 14 identifying one or more operating conditions of the associated combustion system having a time-rate-of-change greater than a predetermined threshold value.

17. A combustion analyzer and diagnostic system comprising:
   a plurality of sensors operable to generate combustion condition data relating to an operating condition of an associated combustion system;
   a controller including a processor and a memory communicatively coupled with said processor, said controller communicatively coupled with said plurality of sensors, said memory operative to store data and one or more programs including a plurality of recommended corrective actions corresponding to one or more performance deviations of the associated combustion system and at least one of a prioritization routine and a plurality of prioritization values, said processor operable to access said data and said one or more programs from said memory such that said processor is programmed to:
   receive combustion condition data having a relation to the associated combustion system generated by one of more of said plurality of sensors;
   analyze said combustion condition data to determine an operating state of the associated combustion system;
   diagnose said operating state of the associated combustion system utilizing one or more logic algorithms to identify one or more recommended corrective actions from said memory;
   generate a ranked listing of said one or more of said identified recommended corrective actions;
   communicate said ranked listing of said one or more of said identified recommended corrective actions to the associated user through said visual communication device;
   receive input data from the associated user regarding performance of said one or more of said identified recommended corrective actions; and,
   alter at least one of said prioritization routine and said plurality of prioritization values in said memory based at least in part on said input data received from the associated user regarding performance of said one or more of said identified recommended corrective actions.

18. An analyzer and diagnostic system according to claim 17, wherein said processor is programmed to receive combustion system data having a relation to the associated combustion system, and determine said operating state of the associated combustion system using a combination of said combustion condition data and said combustion system data.

19. An analyzer and diagnostic system according to claim 17, wherein said processor is programmed to identify one or more operating conditions of the associated combustion system having a time-rate-of-change greater than a predetermined threshold value.

20. An analyzer and diagnostic system according to claim 17 further comprising a hose and probe assembly including communicatively coupled with at least one of said plurality of sensors.

* * * * *